United States Patent
Fujita et al.

(10) Patent No.: US 10,118,513 B2
(45) Date of Patent: Nov. 6, 2018

(54) SEAT STRUCTURE

(71) Applicant: Delta Tooling Co., Ltd., Hiroshima-shi (JP)

(72) Inventors: Etsunori Fujita, Higashihiroshima (JP); Yumi Ogura, Higashihiroshima (JP); Masahiro Kuromoto, Aki-gun (JP)

(73) Assignee: Delta Tooling Co., Ltd., Hiroshima-shi (JP)

( * ) Notice: Subject to any disclaimer, the term of this patent is extended or adjusted under 35 U.S.C. 154(b) by 0 days.

(21) Appl. No.: 15/310,583

(22) PCT Filed: May 11, 2015

(86) PCT No.: PCT/JP2015/063534
§ 371 (c)(1),
(2) Date: Nov. 11, 2016

(87) PCT Pub. No.: WO2015/174382
PCT Pub. Date: Nov. 19, 2015

(65) Prior Publication Data
US 2017/0080832 A1 Mar. 23, 2017

(30) Foreign Application Priority Data
May 12, 2014 (JP) .................................. 2014-099112

(51) Int. Cl.
*B60N 2/42* (2006.01)
*B60N 2/68* (2006.01)
(Continued)

(52) U.S. Cl.
CPC ............. *B60N 2/4228* (2013.01); *B60N 2/22* (2013.01); *B60N 2/42* (2013.01); *B60N 2/42709* (2013.01); *B60N 2/68* (2013.01)

(58) Field of Classification Search
CPC .......... B60N 2/4228; B60N 2/22; B60N 2/42; B60N 2/42709; B60N 2/68
See application file for complete search history.

(56) References Cited

U.S. PATENT DOCUMENTS

| 5,584,525 A | 12/1996 | Nakano et al. | |
|---|---|---|---|
| 6,375,267 B1 * | 4/2002 | Ishikawa | B60N 2/68 297/452.18 |

(Continued)

FOREIGN PATENT DOCUMENTS

| JP | 6-255411 A | 9/1994 |
|---|---|---|
| JP | 2001-145538 A | 5/2001 |

(Continued)

OTHER PUBLICATIONS

International Search Report dated Jul. 7, 2015 in PCT/JP2015/063534 filed May 11, 2015.

*Primary Examiner* — Philip F Gabler
(74) *Attorney, Agent, or Firm* — Oblon, McClelland, Maier & Neustadt, L.L.P.

(57) ABSTRACT

A seat structure. A reinforcing structure in a substantially rectangular frame shape is set in an area where cushion-part side frames and back-part side frames are coupled to each other via reclining mechanism parts, from vicinities of rear portions of the cushion-part side frames up to vicinities of lower portions of the back-part side frames. The reinforcing structure increases unity of a cushion frame and a back frame, and when a load is applied to the back frame due to an impact at the time of a rear-end collision or the like, the load acts as a force deforming mainly the cushion frame via the reinforcing structure, and when the body of a seated person thereafter moves rearward, the load acts as a force deforming mainly the back frame, making it possible to use not only strength of the back frame but also strength of the cushion frame.

8 Claims, 25 Drawing Sheets

(51) Int. Cl.
*B60N 2/22* (2006.01)
*B60N 2/427* (2006.01)

(56) References Cited

U.S. PATENT DOCUMENTS

| | | | |
|---|---|---|---|
| 6,709,053 B1* | 3/2004 | Humer | B60N 2/4228 |
| | | | 297/216.1 |
| 7,093,901 B2* | 8/2006 | Yamada | B60N 2/22 |
| | | | 297/354.12 |
| 2006/0076816 A1* | 4/2006 | Fujita | B60N 2/22 |
| | | | 297/362.12 |
| 2011/0285185 A1* | 11/2011 | Ishizaki | B60N 2/4221 |
| | | | 297/216.12 |
| 2013/0249267 A1* | 9/2013 | Hosokawa | B60N 2/22 |
| | | | 297/354.1 |
| 2015/0203011 A1 | 7/2015 | Fujita et al. | |

FOREIGN PATENT DOCUMENTS

| | | |
|---|---|---|
| JP | 2013-95402 A | 5/2013 |
| WO | 2011/083566 A1 | 7/2011 |
| WO | 2014/027627 A1 | 2/2014 |

\* cited by examiner

SEAT STRUCTURE

TECHNICAL FIELD

The present invention relates to a seat for vehicles such as automobiles, aircrafts, trains, ships, and buses.

BACKGROUND ART

There has been conventionally known a mechanism in which a reinforcing lower frame disposed to extend between lower portions of back-part side frames of a seat back part is deformed rearward at the time of a rear-end collision to absorb an impact applied to the seat back part (refer to Patent Document 1). Further, as in Patent Document 2, there is known a structure in which coupling members couple reclining mechanism parts disposed on both left and right sides, thereby exhibiting predetermined strength against a side collision in addition to an impact absorbing function at the time of a rear-end collision.

PRIOR ART DOCUMENT

Patent Document

Patent Document 1: Japanese Patent Application Laid-open No. 2001-145538
Patent Document 2: Japanese Patent Application Laid-open No. 2013-95402

DISCLOSURE OF THE INVENTION

Problems to be Solved by the Invention

In Patent Document 1, however, the lower frame merely extends between the back-part side frames and thus its contribution to reducing torsional deformation of the left and right portions of a cushion frame is small, and very high moment strength at the time of the rear-end collision cannot be expected. Patent Document 2 adopts the structure in which the reclining mechanism parts are disposed on the both side parts in terms of the seat width direction, operation shafts which are coupled to rotation shafts of the reclining mechanism parts and rotatably penetrate through both back-part side frames and cushion-part side frames are disposed as the coupling members coupling the left and right reclining mechanism parts, the two operation shafts are coupled by a connecting rod, and the operation shafts and the connecting rod are connected by connecting members that are capable of bringing the operation shafts and the connecting rod into surface contact with each other. This structure easily keeps the axis straight against the side collision, while, at the time of the rear-end collision, absorbing an impact by displacing the connecting rod more rearward than the operation shafts. The structure in Patent Document 2, however, also has a function of synchronizing locking and unlocking between the left and right reclining mechanism parts, and thus the operation shafts and the connecting rod need to be rotatable so as to be capable of transmitting their rotational forces. For this purpose, the left and right operation shafts only penetrate through the cushion-part side frames without being fixed thereto, and accordingly do not have a very high function of increasing torsional rigidity of the whole cushion frame including the cushion-part side frames.

That is, the structures of Patent Documents 1 and 2 are basically intended to increase rigidity of a back frame, but the rod merely extends between the lower portions of the back frame, and thus when an impact load due to the rear-end collision or the like is applied, even though the rod deforms, mainly the back frame first deforms to absorb an impact force similarly to a seat structure not having such a rod. Even though a withstand load and impact absorbing power of the back frame itself differ depending on whether or not the rod is present at the lower portion of the back frame, the back frame mainly deforms, and during this period, the cushion frame does not deform much. Accordingly, backward moment strength relies mainly on strength of the back frame, and not much use is made of strength of the cushion frame.

Increasing torsional rigidity of the cushion frame in addition to its transverse rigidity results in the equal application of the load to the left and right reclining mechanism parts and thus allows strength of the reclining mechanism parts themselves to be set low, and is expected to contribute to weight reduction. Further, since the load is equally shared by the left and the right, the decline of a rear portion of the cushion frame at the time of the rear-end collision can be reduced, which can be expected to lead to an improvement of a value of Neck Injury Criterion (NIC) in whiplash injury reducing performance evaluation stipulated in JNCAP (Japan New Car Assessment Program).

The present invention was made in consideration of the above and its object is to provide a seat structure capable of making strength of a cushion frame fully work when an impact of a rear-end collision or the like is applied and having high backward moment strength.

Means for Solving the Problems

To solve the aforesaid problems, the seat structure of the present invention is a seat structure which includes a seat cushion part and a seat back part coupled to each other via a reclining mechanism part, the seat structure including a reinforcing structure in a substantially rectangular frame shape provided in an area where the seat cushion part and the seat back part are coupled to each other via the reclining mechanism part, from vicinities of rear portions of cushion-part side frames included in a cushion frame of the seat cushion part up to vicinities of lower portions of back-part side frames included in a back frame of the seat back part, the reinforcing structure including a pair of rigid members provided in vicinities of side portions of the area and at least two bridge members arranged at an interval from each other and extending between the pair of rigid members along a left and right direction.

Preferably, at least one of the bridge members included in the reinforcing structure is set within an area not higher than a designed hip point. More preferably, the at least two bridge members including the bridge member set within the area not higher than the designed hip point are set in such a positional relation that the bridge member disposed more rearward is set at a position higher than the bridge member disposed more forward.

Preferably, in a case where at least one of the bridge members included in the reinforcing structure is set behind the hip point, the at least one bridge member has a rearward projecting portion that projects rearward. More preferably, in the case where the at least one of the bridge members included in the reinforcing structure is set behind the hip point, the at least one bridge member further has an easily deforming portion that serves as a starting point of deformation caused by a rearward load.

Preferably, the left and right rigid members each have at least two coupling portions coupled to the at least two bridge members, and in addition, have at least one coupling portion coupled to the cushion-part side frame. Preferably, the reclining mechanism parts are provided in pair on left and right.

Preferably, the rigid members included in the reinforcing structure are each composed of a joining bracket that has relatively higher rigidity than the cushion-part side frame or the back-part side frame to which the joining bracket is coupled, and that is coupled to the rear portion of the cushion-part side frame and the lower portion of the back-part side frame. Further, preferably, the rigid members included in the reinforcing structure are constituted by gears disposed to face each other in the pair of left and right reclining mechanism parts. Preferably, the rigid members have a larger plate thickness than a plate thickness of the rear portions of the cushion-part side frames coupled to the reclining mechanism parts or a plate thickness of the lower portions of the back-part side frames coupled to the reclining mechanism parts.

Effect of the Invention

In the present invention, the reinforcing structure in the substantially rectangular frame shape is set in the area where the seat cushion part and the seat back part are coupled to each other via the reclining mechanism parts, from the vicinities of the rear portions of the cushion-part side frames included in the cushion frame of the seat cushion part up to the vicinities of the lower portions of the back-part side frames included in the back frame of the seat back part. The reinforcing structure in the substantially rectangular frame shape is disposed in the aforesaid area corresponding to vicinities of the reclining mechanism parts, and this reinforcing structure has the pair of rigid members and the at least two bridge members are disposed to extend between the rigid members.

With this structure, the unity of the cushion frame and the back frame is increased via the reinforcing structure, and when a load is applied to the back frame due to an impact of a rear-end collision or the like, the load acts as a force deforming mainly the cushion frame via the reinforcing structure, and when the body of a seated person thereafter moves rearward, the load then acts as a force deforming mainly the back frame. That is, when the impact load of the rear-end collision or the like is applied, it is possible to make use of not only strength of the back frame but also strength of the cushion frame, enabling to make backward moment higher than conventionally.

Further, the reinforcing structure in the substantially rectangular frame shape increases torsional rigidity of the cushion frame in addition to its transverse rigidity. This increase of the rigidity of the cushion frame results in the equal application of the load to the left and right reclining mechanism parts and thus allows the strength of the reclining mechanism parts themselves to be set low, and can contribute to a weight reduction. Further, because the load is equally shared by the right and the left, the decline of the rear portion of the cushion frame and the downward movement of the seated person are reduced when the impact of the rear-end collision or the like is applied, which can contribute to an improvement of a neck injury criterion value.

However, setting the reinforcing structure to consequently increase the rigidity hinders the rearward movement as well as the downward movement, and accordingly rebounding occurs, so that a relative acceleration of a portion between the head and the chest is likely to increase. To prevent this, at least one of the bridge members included in the reinforcing structure is preferably disposed within the area not higher than the designed hip point. This facilitates leading the body of the seated person rearward to enable to reduce the rebounding at the time of the rear-end collision. This can contribute to a further improvement of the neck injury criterion value.

Further, in the case where at least one of the bridge members included in the reinforcing structure is set behind the designed hip point, this bridge member preferably has the rearward projecting portion projecting rearward, and as a result it can easily receive the human body. Further, by forming the easily deforming portion serving as a trigger (starting point) of the rearward deformation, it is possible to easily lead the human body further rearward to reduce the rebounding. This can contribute to a further improvement of the neck injury criterion value.

DESCRIPTION OF EMBODIMENTS

Figure 1:
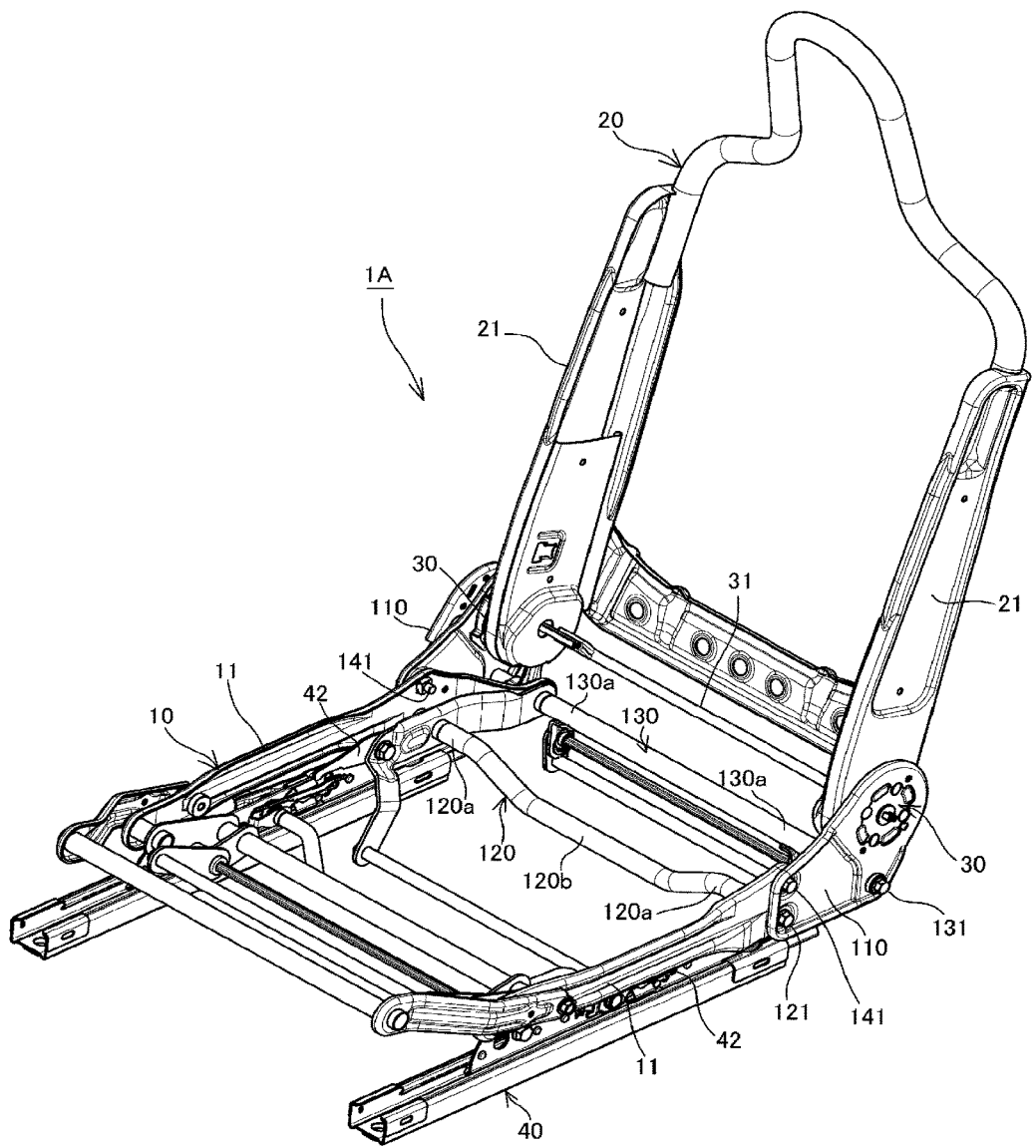
FIG. 1 is a perspective view illustrating a seat structure according to a first embodiment of the present invention (excluding cushioning members and so on supported by a cushion frame, a back frame, and so on).
Figure 2:
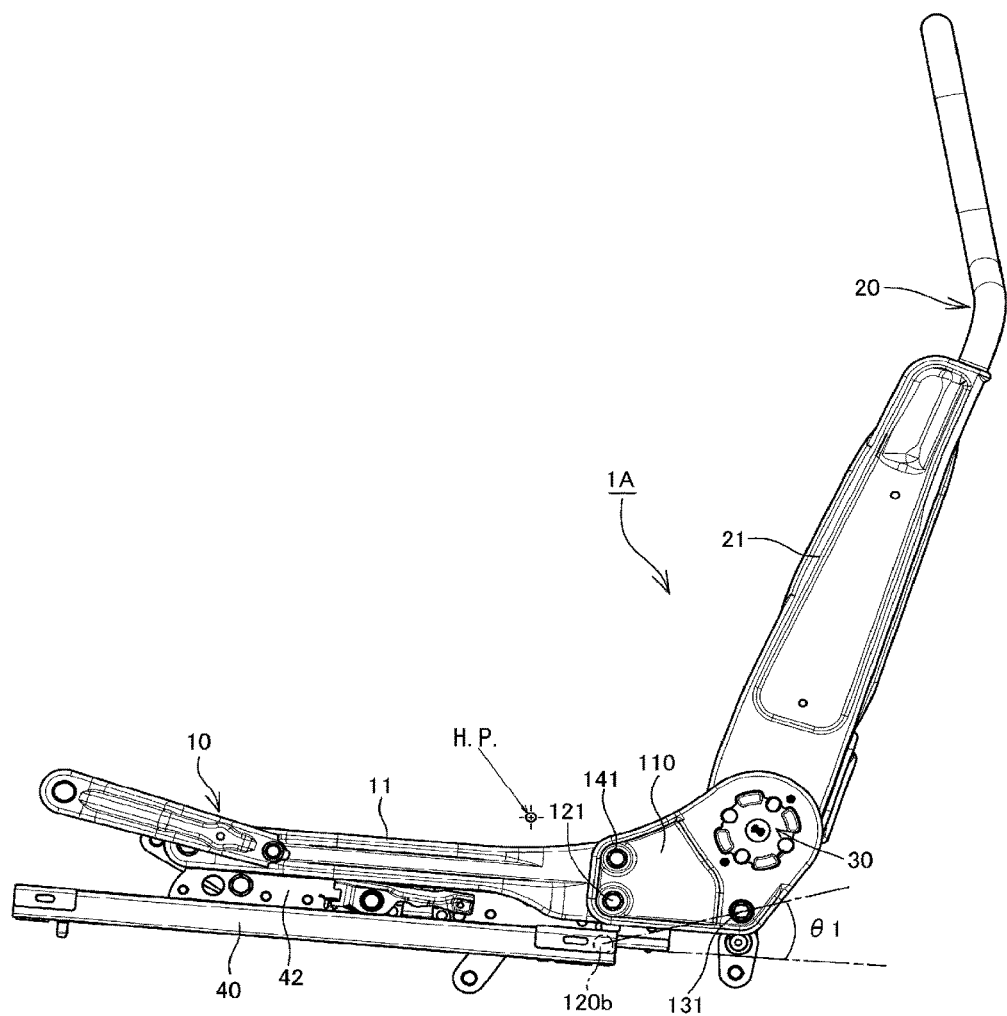
FIG. 2 is a side view of FIG. 1.
Figure 3:
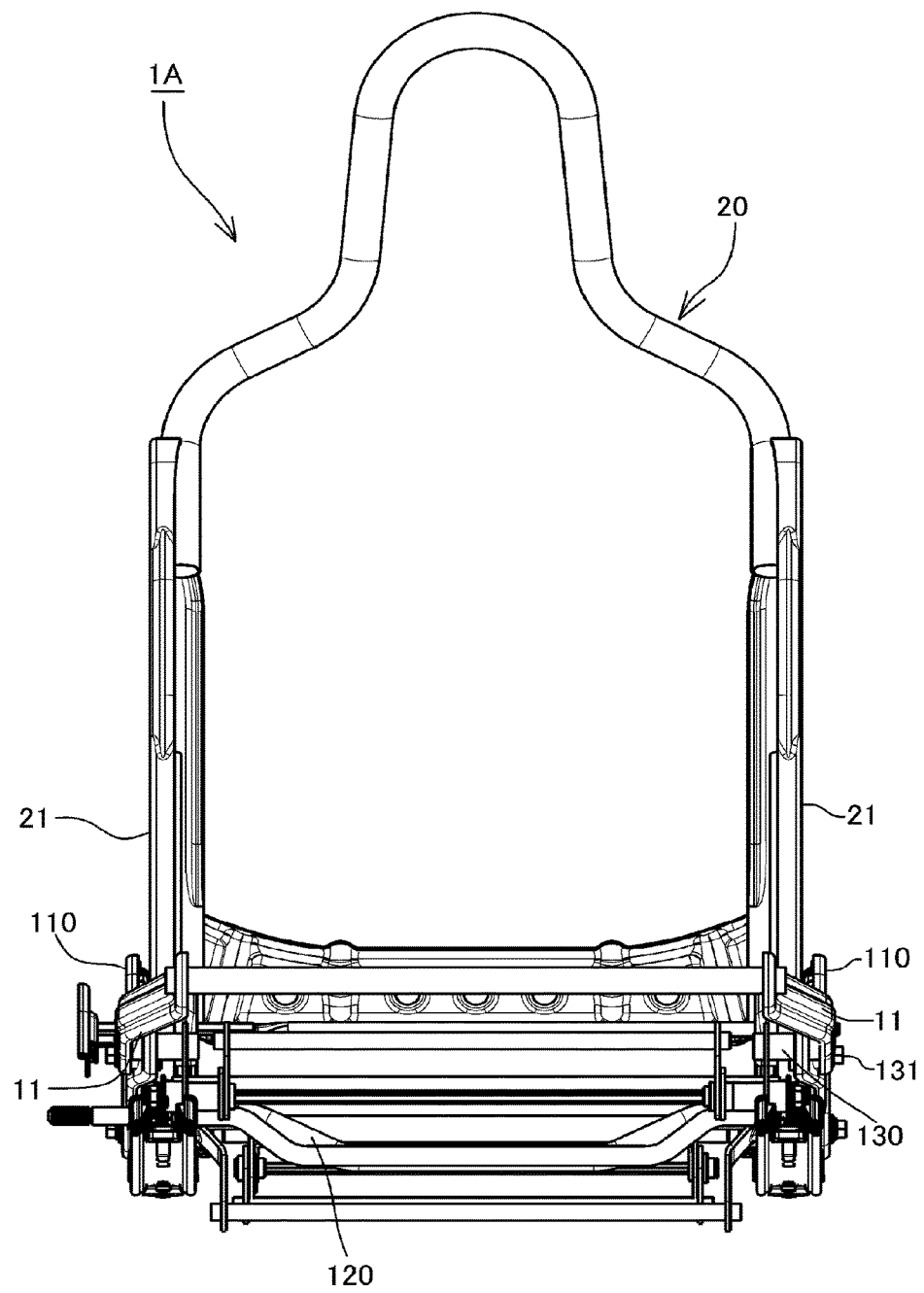
FIG. 3 is a front view of FIG. 1.
Figure 4:
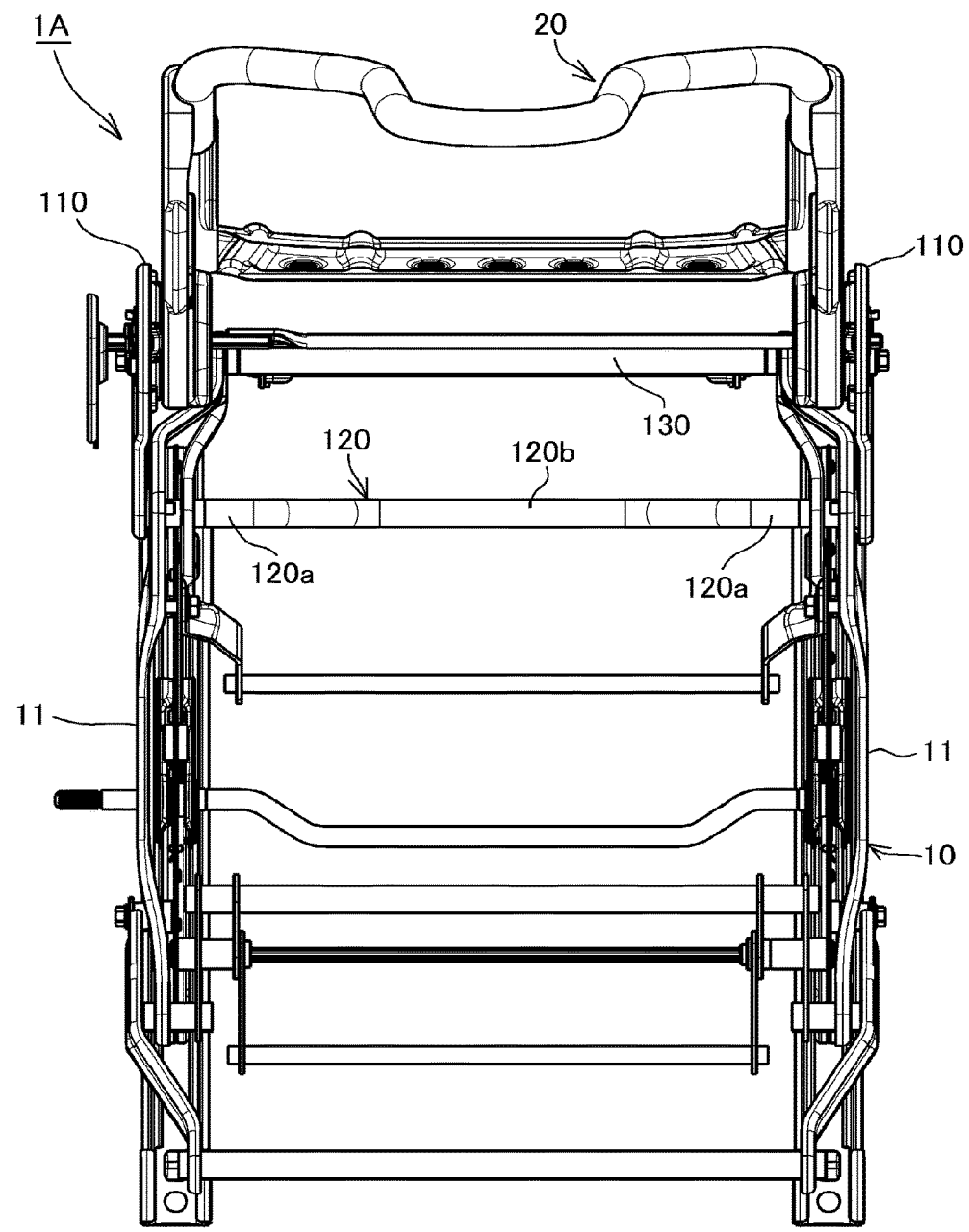
FIG. 4 is a plane view of FIG. 1.

The present invention will be hereinafter described in more detail based on embodiments illustrated in the drawings. FIG. 1 to FIG. 5 are views illustrating a seat structure 1A according to a first embodiment of the present invention. The seat structure 1A includes a cushion frame 10 included in a seat cushion part, a back frame 20 included in a seat back part, a pair of left and right reclining mechanism parts 30, 30, and so on. Note that views illustrating seat structures in this embodiment and later-described embodiments do not illustrate cushioning members, pad members, skin layer members, and so on supported by the cushion frame 10, the back frame 20, and so on.

The cushion frame 10 includes two cushion-part side frames 11, 11 supported respectively by upper frames 42, 42 disposed on left and right of a seat slider device 40. The back frame 20 includes a pair of back-part side frames 21, 21 disposed at a predetermined interval from each other.

The reclining mechanism parts 30, 30 each include a gear part, a return spring (not illustrated), and so on. Specifically, that disclosed in Japanese Patent No. 5393990 is adopted. That is, this reclining mechanism includes an internal gear and a lock gear which slides in a radial direction. By controlling the sliding of the lock gear, to fix the seat back part at a predetermined reclining angle, external teeth of the lock gear are engaged with internal teeth of the internal gear to produce a locked state, and to allow the seat back part to rotate, the lock gear is slid in a reverse direction to disengage the external teeth from the internal teeth, and the reclining angle is adjusted. The reclining mechanism parts 30, 30 are supported between a pair of left and right joining brackets 110, 110, which are coupled to rear portions of the cushion-part side frames 11, 11, and lower portions of the back-part side frames 21, 21. A shaft member 31 which synchronizes the sliding operations of the lock gears is disposed to extend between the pair of left and right reclining mechanism parts 30, 30.

The joining brackets 110, 110 support the reclining mechanism parts 30, 30 by their upper portions above their substantially middle portions, and the upper portions are coupled to the lower portions of the back-part side frames 21, 21. Lower portions of the joining brackets 110, 110 under the substantially middle portions are coupled to the rear portions of the cushion-part side frames 11, 11. In this embodiment, the lower portion of each of the joining brackets 110, 110 and the rear portion of each of the cushion-part side frames 11, 11 are fixedly coupled at three places via bolts as will be described later.

The pair of left and right joining brackets 110, 110 in this embodiment constitute a "pair of rigid members" stipulated in the claims. The "rigid members" mean that they are made of a material higher in rigidity than the cushion-part side frames 11 and the back-part side frames 21 to which the rigid members are coupled. The material having high rigidity in a case where it is the same steel material as those of the cushion-part side frames 11 and the back-part side frames 21 is preferably a material larger in plate thickness than vicinities of the rear portions of the cushion-part side frames 11 or vicinities of the lower portions of the back-part side frames 21, and for example, is preferably a material having rigidity within a range of 1.5 to 10 times as high as that of the aforesaid portions. The joining brackets 110, 110 constituting the rigid members can of course have the higher rigidity by having a larger plate thickness than the plate thickness of the vicinities of the rear portions of the cushion-part side frames 11 or the vicinities of the lower portions of the back-part side frames 21, but even if having a plate thickness equal to or less than the plate thickness of these portions, the joining brackets 110, 110 can have the higher rigidity by being heat-treated.

Between the joining brackets 110, 110, two bridge members 120, 130 are disposed at an interval from each other and extend along the left and right direction. The bridge members 120, 130 are each made of a hollow or solid long member. The first bridge member 120 extends between portions close to front lower ends of the joining brackets 110, 110, and their end portions 120a, 120a are coupled to the portions close to the front lower ends of the joining brackets 110, 110 via bolts 121, 121 in areas where the cushion-part side frames 11, 11 and the joining brackets 110, 110 overlap with each other. The second bridge member 130 extends between portions close to rear lower ends of the joining brackets 110, 110, and their end portions 130a, 130a are coupled via bolts 131, 131 to the portions close to the rear lower ends of the joining brackets 110, 110 in the areas where the cushion-part side frames 11, 11 and the joining brackets 110, 110 overlap with each other. Further, portions close to front upper ends, of the joining brackets 110, 110, which are located above the coupling positions with the first bridge member 120, are stacked on the cushion-part side frames 11, 11 to be coupled to the cushion-part side frames 11, 11 via bolts 141, 141. Accordingly, the left and right joining brackets 110, 110 each have two coupling portions (the portions coupled via the bolt 121, 121 and the bolt 131, 131) coupled to the two bridge members 120, 130, and in addition the coupling portion (the portion coupled via the bolt 141, 141) coupled to the cushion-part side frame 11, 11.

Figure 5:
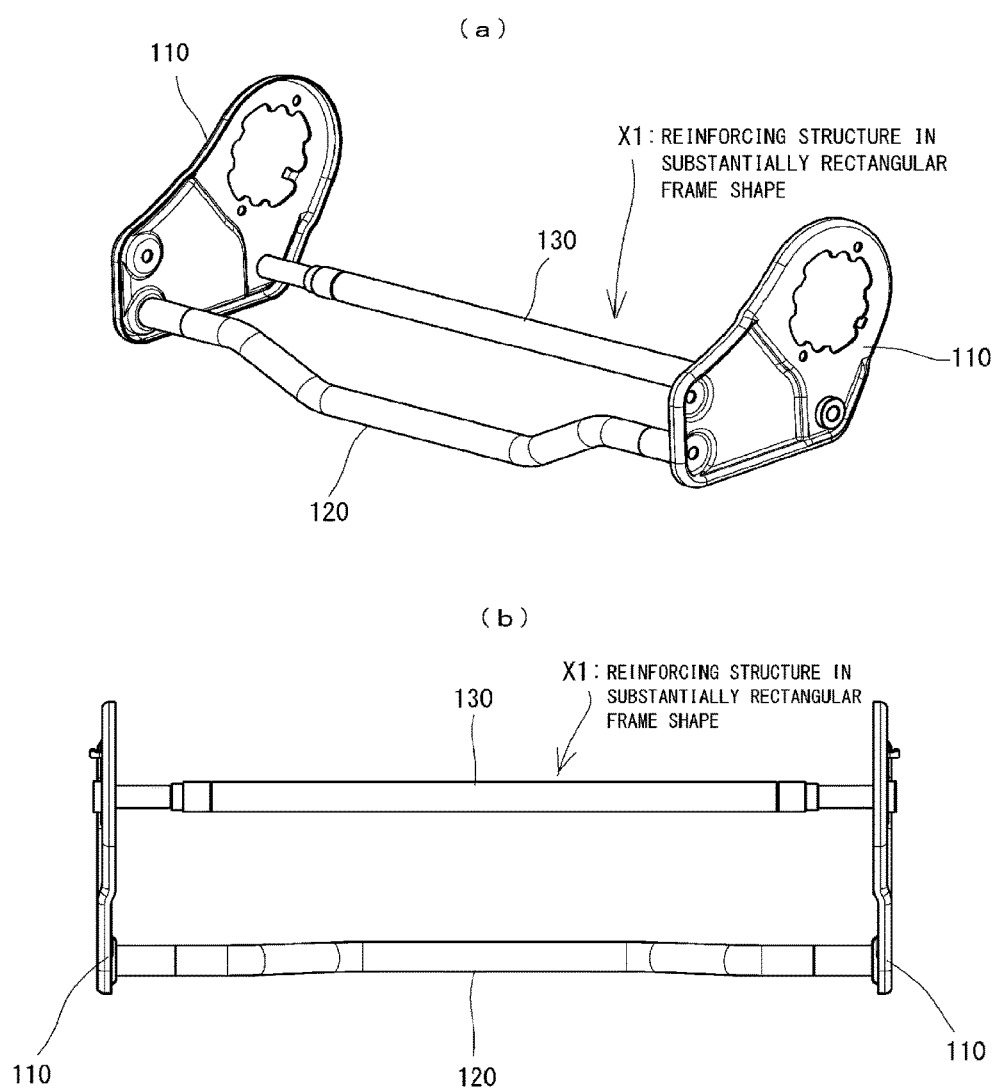
FIG. 5(a) is a perspective view illustrating a reinforcing structure in a substantially rectangular frame shape in the first embodiment.
FIG. 5(b) is a plane view of FIG. 5(a).

As a result of this coupling, the left and right joining brackets 110, 110 which are the rigid members and the two bridge members 120, 130 disposed between the joining brackets 110, 110 constitute a "reinforcing structure X1 in a substantially rectangular frame shape" stipulated in the claims, as illustrated in FIG. 5. Further, since the joining brackets 110, 110 are coupled to the lower portions of the back-part side frames 21, 21 and the rear portions of the cushion-part side frames 11, 11 as described above, the "reinforcing structure X1 in the substantially rectangular frame shape" is set in an area where the cushion-part side frames 11, 11 and the back-part side frames 21, 21 are coupled via the reclining mechanism parts 30, that is, in an area from vicinities of the rear portions of the cushion-part side frames 11, 11 to vicinities of the lower portions of the back-part side frames 21, 21.

Here, the first bridge member 120 is formed such that its middle portion 120b is deformed in a substantially concave shape so as to be located lower than vicinities of the end portions 120a, 120a. A reason for this is as follows. The seat structure 1A of this embodiment illustrated in FIG. 1 to FIG. 4 is for a sport type vehicle in which the height of the cushion-part side frames 11, 11 of the cushion frame 10 is relatively low, that is, a designed height of a hip point (H.P.) is lower than normally, and accordingly, the first bridge member 120 located lower than the hip point is formed to project downward in the substantially concave shape, whereby a recess is formed. On the other hand, the second bridge member 130 located more rearward than the first bridge member 120 has a linear shape, and as a result, a set height of the second bridge member 130 is higher than a set height of the middle portion 120b of the first bridge member 120. Note that, in this embodiment, the first bridge member 120 and the second bridge member 130 are both disposed lower than the hip point. Preferably, the set height of the middle portion 120b of the first bridge member 120 is set within a range of 70 to 150 mm below the hip point, and the set height of the second bridge member 130 is set within a range of 50 to 130 mm below the hip point. This facilitates leading the body of a seated person moving diagonally in a rear upward direction to space between the back-part side frames 21, 21 of the back frame 20 at the time of a rear-end collision, reduces the rebounding, and thus can contribute to an improvement of a neck injury criterion value. Therefore, a difference between the set height of the middle portion 120b of the first bridge member 120 and the set height of the second bridge member 130 is set such that an angle θ1 (refer to FIG. 2) of a virtual line connecting the middle position of the middle portion 120b of the first bridge member 120 and the middle position of the second bridge member 130 relative to a sliding direction line of a slider becomes, preferably, within a range of 3 to 70 degrees, and more preferably within a range of 10 to 45 degrees.

According to this embodiment, the cushion frame 10 and the back frame 20 are integrated by the reinforcing structure X1 in the substantially rectangular frame shape via the reclining mechanism parts 30, and accordingly, when an impact is applied due to a rear-end collision, a backward moment does not act mainly on only the back frame 20 but acts also on the cushion frame 10 and the reclining mechanism parts 30. As a result, the back frame 20 does not deform first but the impact is withstood by strengths of the cushion frame 10 and the reclining mechanism parts 30, and further, the cushion frame 10 and the reclining mechanism parts 30 deform to absorb the force. Thereafter, the body of the seated person is led rearward by being guided by the first bridge member 120 and the second bridge member 130 included in the reinforcing structure X1, and tries to enter the space between the back-part side frames 21, 21 of the back frame 20 even though trying to slightly sliding up along the surface of the seat back part. Consequently, the back frame 20 starts to deform to further absorb the impact force. Therefore, according to this embodiment, the impact force can be absorbed by all of the cushion frame 10, the back frame 20, and the reclining mechanism parts 30, making it possible to obtain the seat structure 1A having high backward moment strength.

FIG. 6 to FIG. 11 are views illustrating a seat structure 1B according to a second embodiment of the present invention. In this embodiment, the height of cushion-part side frames 11, 11 of a cushion frame 10 is higher than in the first embodiment, and the seat structure 1B is used in a sedan-type lip vehicle. In the second embodiment as well, the cushion frame 10 and a back frame 20 are integrated by a reinforcing structure X2 in a substantially rectangular frame shape via reclining mechanism parts 30, 30 similar to those of the first embodiment.

Figure 6:
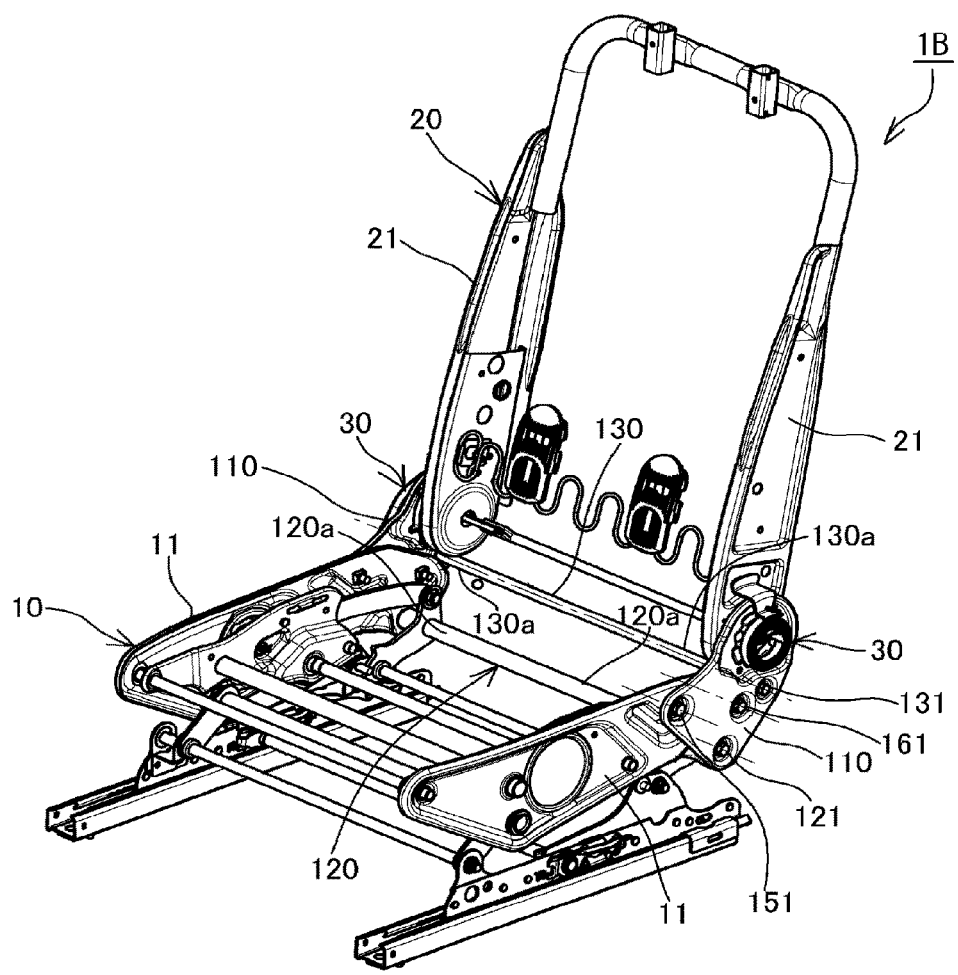
FIG. 6 is a perspective view illustrating a seat structure according to a second embodiment of the present invention (excluding cushioning members and so on supported by a cushion frame, a back frame, and so on).
Figure 7:
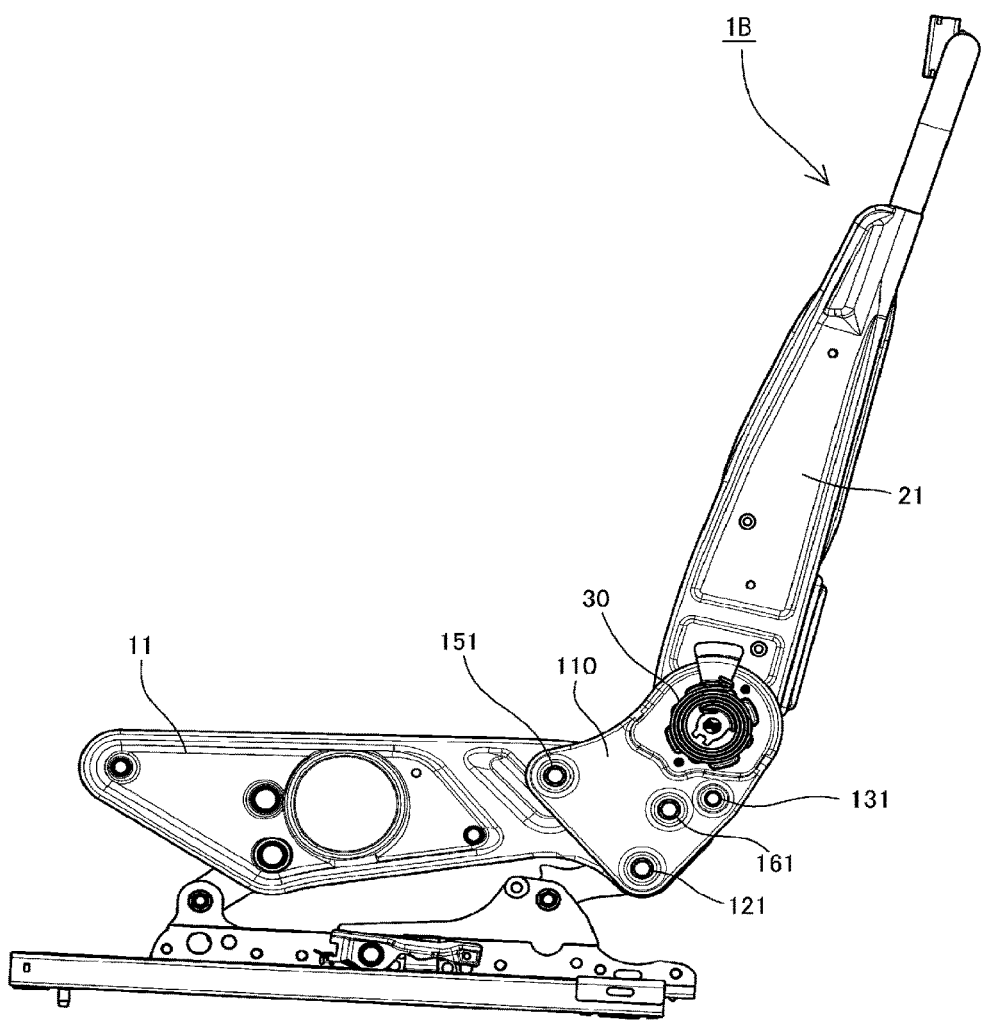
FIG. 7 is a side view of FIG. 6.
Figure 8:
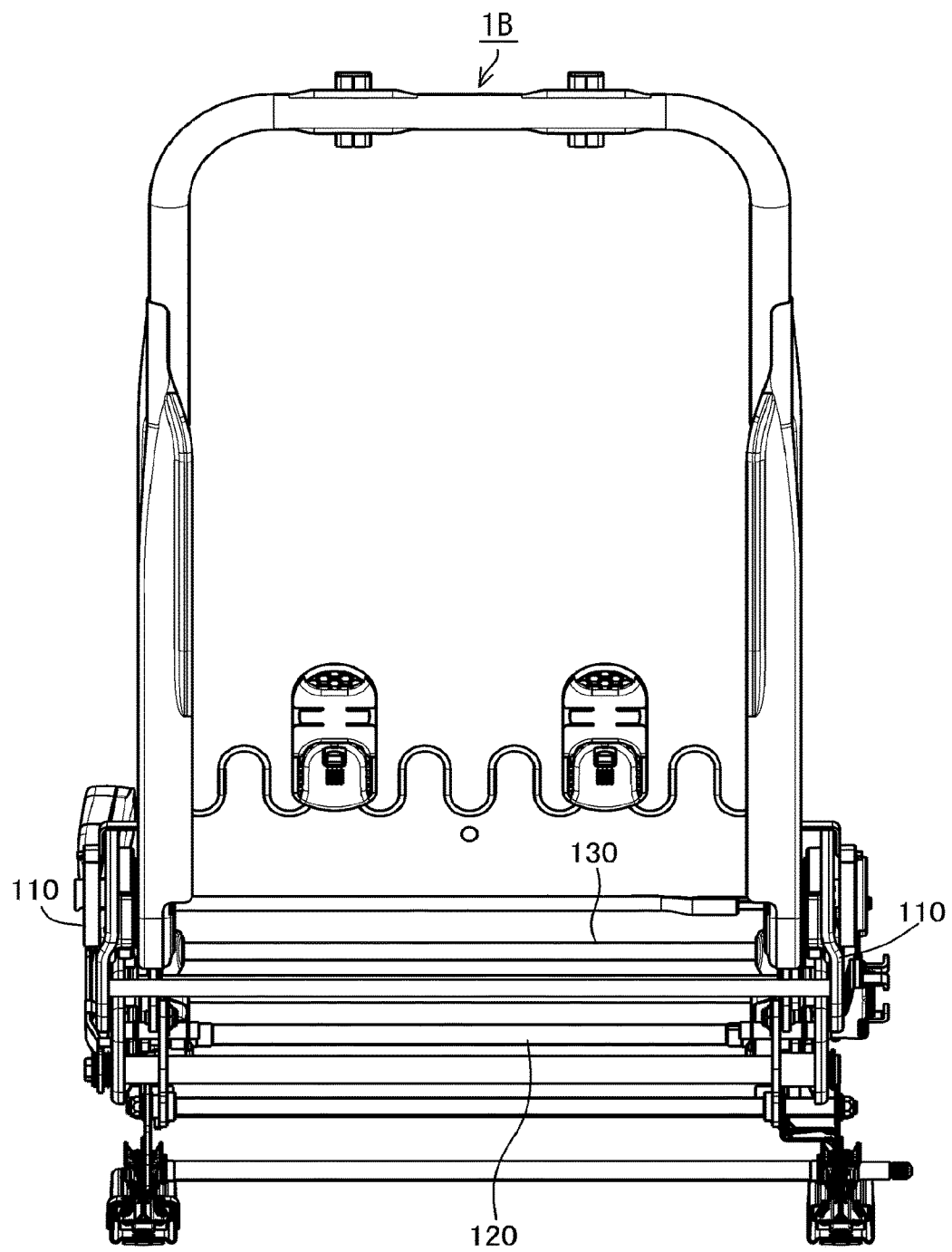
FIG. 8 is a front view of FIG. 6.
Figure 9:
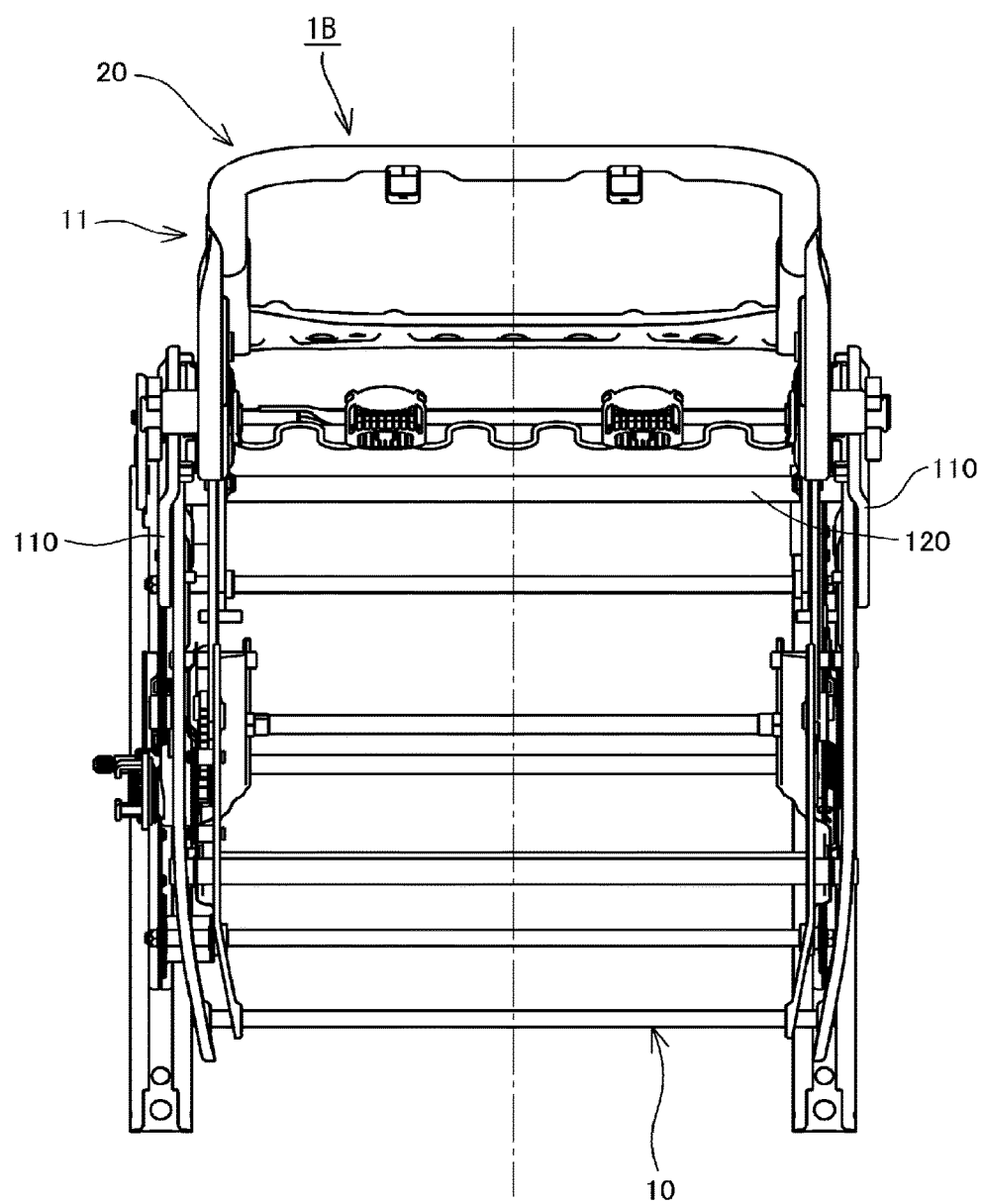
FIG. 9 is a plane view of FIG. 6.
Figure 11:
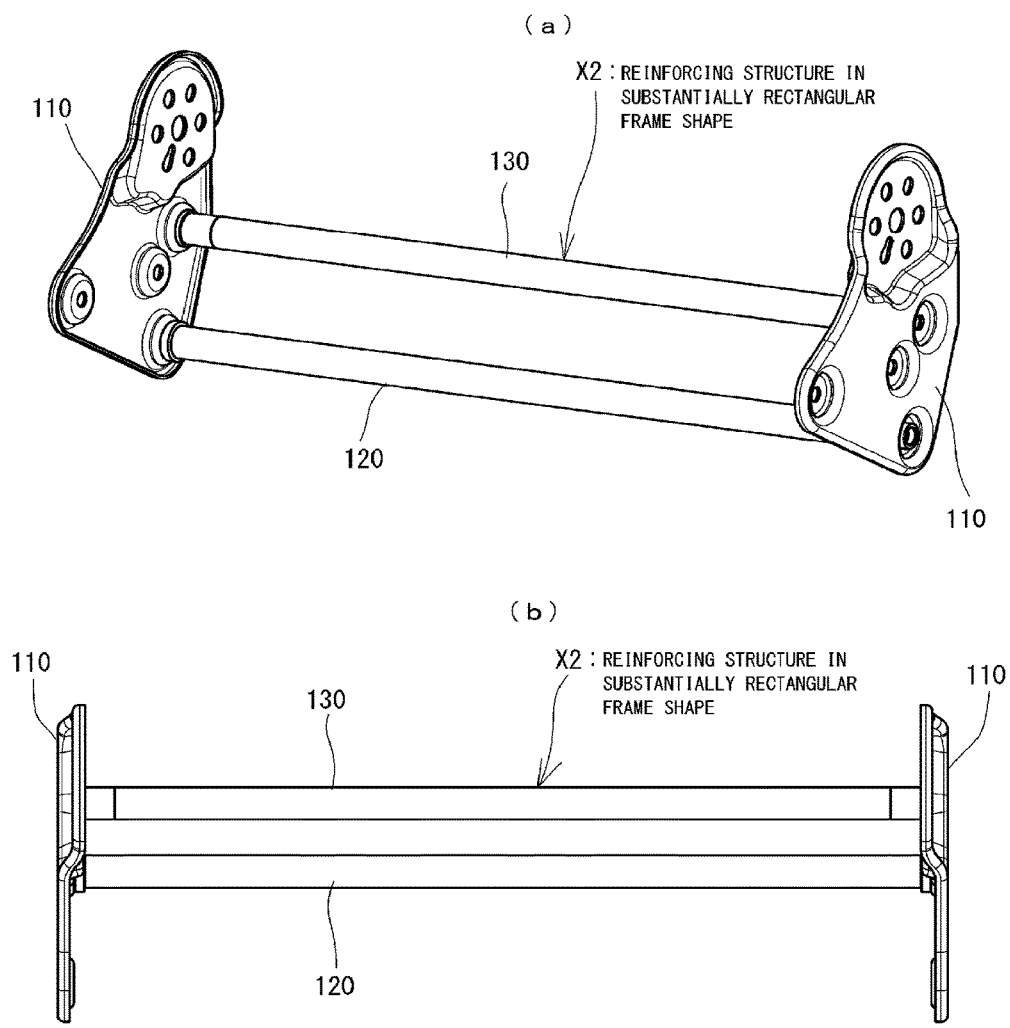
FIG. 11(a) is a perspective view illustrating a reinforcing structure in a substantially rectangular frame shape in the second embodiment.
FIG. 11(b) is a plane view of FIG. 11(a).

The reinforcing structure X2 in the substantially rectangular frame shape of this embodiment include: joining brackets 110, 110 which are coupled to the cushion-part side frames 11, 11 and back-part side frames 21, 21 and made of rigid members similar to those of the above-described first embodiment; and two bridge members 120, 130 (refer to FIG. 11). As illustrated in FIG. 6 and FIG. 7, the joining brackets 110, 110 are formed such that their upper portions above their substantially middle portions in terms of an up and down direction have a width corresponding to the width of vicinities of lower portions of the back-part side frames 21, 21, their upper edges are formed in an arc shape, and their lower half portions under the substantially middle portions have a substantially triangular shape whose apexes are located on lower sides. The reclining mechanism parts 30 are supported at the upper portions of the joining brackets 110, 110, and the upper portions are coupled to the lower portions of the back-part side frames 21, 21. The first bridge member 120 is disposed to extend between vicinities of the apexes of the substantially triangular portions which are the lower half portions under the substantially middle portions. The second bridge member 130 is disposed at a diagonally upper position of the first bridge member 120 and extends between portions corresponding to positions slightly below the reclining mechanism parts 30, 30.

Specifically, the first bridge member 120 extends, with their end portions 120a, 120a being coupled via bolts 121, 121 in areas where the cushion-part side frames 11, 11 and the joining brackets 110, 110 overlap with each other. The second bridge member 130 extends, with their end portions 130a, 130a passing through gaps between the cushion-part side frames 11, 11 and the back-part side frames 21, 21 and being directly coupled to the joining brackets 110, 110 via bolts 131, 131. The joining brackets 110, 110 are coupled to the rear portions of the cushion-part side frames 11, 11 at their forward projecting portions via bolts 151, 151 and at their portions between the first bridge member 120 and the second bridge member 130 via bolts 161, 161. Therefore, in this embodiment, the reinforcing structure X2 in the substantially rectangular frame shape is structured such that the joining brackets 110, 110 are each coupled at totally four places, namely, at three places (the bolts 121, 151, 161) in each of the areas where the cushion-part side frames 11, 11 and the joining brackets 110, 110 overlap with each other and at one place (the bolt 131) in each of the areas where the cushion-part side frames 11, 11 do not overlap with the joining brackets 110, 110.

Figure 10:
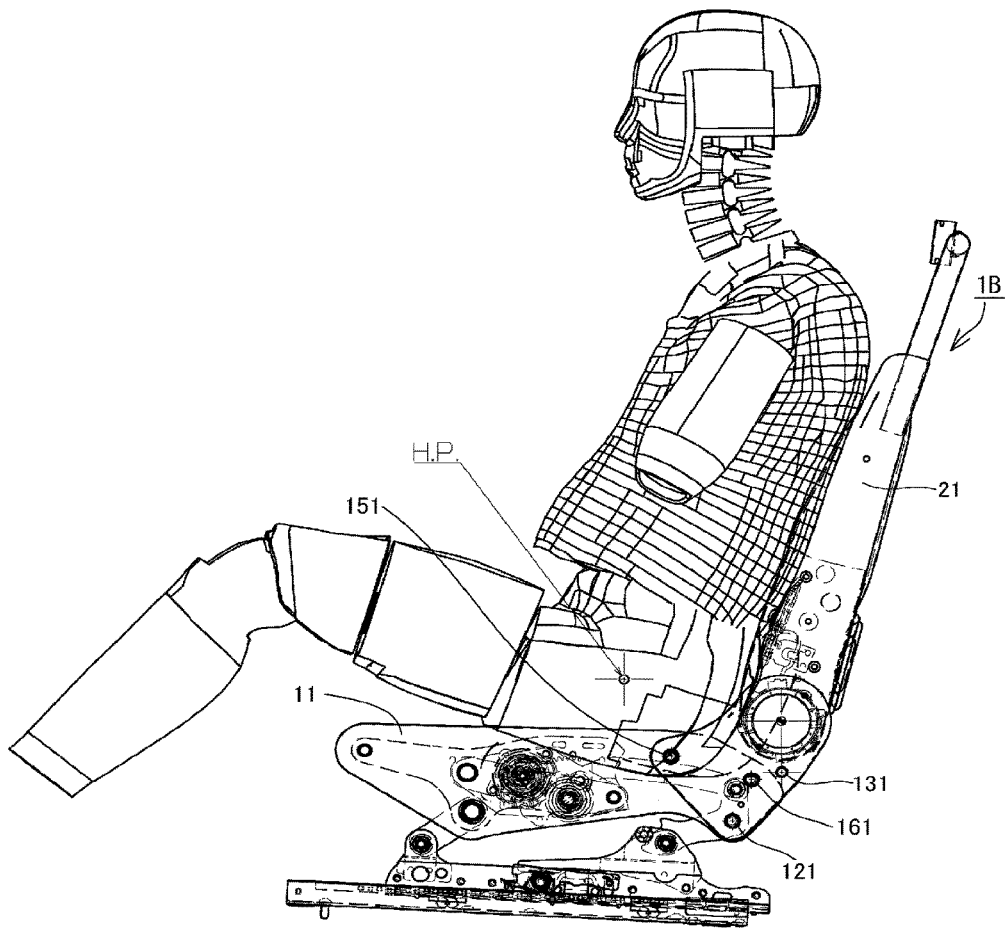
FIG. 10 is an explanatory view of a positional relation between a designed hip point and bridge members in the seat structure according to the second embodiment.

In this embodiment as well, as illustrated in FIG. 10, the first bridge member 120 and the second bridge member 130 are set lower than a designed hip point (H.P.), and a set height of the second bridge member 130 is higher than a set height of the first bridge member 120. This is preferable because this facilitates leading the body of a seated person rearward when an impact is applied. This point is the same as in the above-described first embodiment. However, the seat structure 1B of this embodiment is for the sedan-type vehicle, and thus it is preferable that the set height of the first bridge member 120 is set within a range of 100 to 250 mm below the hip point, and the set height of the second bridge member 130 is set within a range of 70 to 220 mm below the hip point.

In this embodiment as well, the cushion frame 10 and the back frame 20 are integrated by the reinforcing structure X2 in the substantially rectangular frame shape via the reclining mechanism parts 30, and as in the above-described first embodiment, the impact is not withstood by only the back frame 20 but in addition can be withstood by strengths of the cushion frame 10 and the reclining mechanism parts 30, so that high backward moment strength can be exhibited.

FIG. 12 to FIG. 19 are views illustrating a seat structure 1C according to a third embodiment of the present invention. This embodiment is the same as the above-described embodiments in that rear portions of cushion-part side frames 11, 11 of a cushion frame 10 and lower portions of back-part side frames 21, 21 of a back frame 20 are coupled via left and right reclining mechanism parts 300, 300, but is different in the structure of a reinforcing structure X3 in a substantially rectangular frame shape.

Firstly, as illustrated in FIG. 13 to FIG. 16, the seat structure 1C includes cushion-side brackets 111, 111 projecting upward from the rear portions of the cushion-part side frames 11, 11. Upper edge portions of the cushion-side brackets 111, 111 are formed in an arc shape, gear teeth 311, 311 are formed on the upper edge portions, and portions including the gear teeth 311, 311 are driving worm wheels 310, 310. The driving worm wheels 310, 310 may be gears having teeth along the whole periphery, or may be sector gears having teeth only on a use region as in this embodiment. Further, the driving worm wheels 310 and later-described driven worm wheels 330 both include a case where helical gears are used as the worm wheels.

Next, gear attachment brackets 320, 320 are provided on lower outer surfaces of the back-part side frames 21, 21, the driven worm wheels 330, 330 are rotatably supported at upper positions in gaps between the lower outer surfaces and the gear attachment brackets 320, 320, and thereunder, worms 340, 340 to be engaged with the driven worm wheels 330, 330 are disposed.

The rotation centers of the driven worm wheels 330, 330 are not the centers of the driven worm wheels 330, 330 but are eccentric therewith, and when turned in one direction by the operation of an operation lever coupled thereto via a synchronization rod 331, the driven worm wheels 330, 330 are pressed against the worms 340, 340, and further the worms 340, 340 are pressed against the driving worm wheels 310, 310, resulting in locking. When the operation lever is operated in the other direction, gaps between gear teeth of the driven worm wheels 330, 330 and the worms 340, 340, and gaps between gear teeth of the worms 340, 340 and the driving worm wheels 310, 310 become backlashes appropriate for allowing their rotation, so that a seat back part can tilt. Therefore, in this embodiment, the reclining mechanism parts 300, 300 include the driving worm wheels 310, 310, the driven worm wheels 330, 330, and the worms 340, 340. In the reclining mechanism parts 300, 300, when the seat back part tilts, the driving worm wheels 310, 310 provided integrally with the cushion-side brackets 111, 111 do not rotate, but the worms 340, 340 turn together with the back-part side frames 21, 21 along the peripheries of the driving worm wheels 310, 310. In this sense, the worms 340, 340 can be said as moving like planetary gears relatively to the driving worm wheels 310, 310. The rotation of the worms 340, 340 causes the rotation of the driven worm wheels 330, 330, and their motions enable the tilting operation of the seat back part.

The driving wheel worms 310, 310, the worms 340, 340, and the driven worm wheels 330, 330 are mutually engaged to rotate similarly to the movement of the planetary gear mechanisms, and to cope with manufacturing errors and the like, the above-described backlashes are necessary. On the other hand, if the backlashes are too large, tooth surfaces hit against each other due to torsional vibration and so on of a shaft and a gear system during driving to generate juddering sound. Since the magnitude of the juddering sound is proportional to a square of the size of a backlash, the backlashes need to be as small as possible in order to reduce the juddering sound. Consequently, it is possible to reduce damage of the tooth surfaces due to the vibration caused by the gear rattling. However, when the backlashes are set too small, the backlash minimum value which varies during the driving becomes zero at a certain timing, and the gear system sometimes does not rotate smoothly. Therefore, it is important to set a ratio of contact between the gears appropriately in order to keep the smooth rotation, taking the reduction of the backlashes into consideration while minimizing a variation of center distances between base circles of the aforesaid gears (the driving worm wheels 310, 310, the worms 340, 340, and the driven worm wheels 330, 330).

Here, in the third embodiment, the driving worm wheels 310, 310 are provided integrally with the cushion-side brackets 111, 111 and thus do not rotate as described above. Therefore, in this embodiment, a later-described first bridge member 1200 is disposed to extend between the non-rotating driving worm wheels 310, 310. The driving worm wheels 310, 310, though integrally provided with the cushion-side brackets 111, 111 as described above, are formed of a gear material made of a steel material and basically have high strength. Therefore, the driving worm wheels 310, 310 constitute a "pair of rigid members" stipulated in the claims. That is, in this embodiment, the driving worm wheels 310, 310 which are members included in the reclining mechanism parts 300, 300 constitute the pair of rigid members. This eliminates a need for using rigid members different from the reclining mechanism parts 300, 300, as compared with the above-described embodiments.

In this embodiment, the first bridge member 1200 and a second bridge member 1300 are disposed to extend between the pair of cushion-side brackets 111, 111 including the driving worm wheels 310, 310. The first bridge member 1200 is disposed to extend between vicinities of the centers of the non-rotating driving worm wheels 310, 310 in the pair of cushion-side brackets 111, 111 as described above. The second bridge member 1300 is disposed below and a predetermined distant apart from the first bridge member 1200, and their end portions 1300a, 1300a together with the cushion-part side frames 11, 11 are coupled to rear lower end portions of the cushion-side brackets 111, 111 via bolts 1301, 1301. Further, front lower end portions of the cushion-side brackets 111, 111 are coupled to the cushion-part side frames 11, 11 via bolts 1401, 1401.

The cushion-side brackets 111, 111 are integrated with the driving worm wheels 310, 310 as described above, and are made of the same material as that of the driving worm wheels 310, 310. Therefore, as the cushion-side brackets 111, 111 integrated with the driving worm wheels 310, 310, a high-rigidity material typically adopted as a gear in a reclining mechanism part of a seat structure for vehicles such as automobiles, for example, a steel material having a 3 to 10 mm thickness, or a heat-treated steel material, is used. Therefore, in this embodiment, the cushion-side brackets 111, 111 and the driving worm wheels 310, 310 both constitute the aforesaid "pair of rigid members", and the pair of rigid members and the first and second bridge members 1200, 1300 arranged at a predetermined interval from each other in a substantially up and down direction constitute the "reinforcing structure X3 in the substantially rectangular frame shape (refer to FIG. 19). Then, the "pair of rigid members" composed of the cushion-side brackets 111, 111 and the driving worm wheels 310, 310 are each fixed at three places, namely, two coupling portions coupled to the two bridge members 1200, 1300 and a coupling portion coupled to the cushion-part side frame 11, 11 via the aforesaid bolt 1401, 1401.

Here, the first bridge member 1200 is set behind a designed hip point. Accordingly, the human body comes into contact with the first bridge member 1200 when moving rearward at the time of the application of an impact, which involves a possibility to cause the human body to rebound. So, in order to promote the rearward movement of the human body, the first bridge member 1200 is preferably formed to have a rearward projecting portion 1201 projecting rearward in a plane view in the vicinity of a substantially middle in terms of the longitudinal direction so that the first bridge member 1200 easily receives the human body. Further, it is more preferable to provide easily deforming portions 1201a, 1201a which serve as triggers (starting points) of the rearward displacement deformation of the rearward projecting portion 1201 when a rearward load is further applied after the human body is received in the rearward projecting portion 1201. In this embodiment, the easily deforming portions 1201a, 1201a are formed in the rearward projecting portion 1201 at a predetermined interval from each other. The easily deforming portions 1201a, 1201a can be formed as follows, for instance. The rearward projecting portion 1201 is worked to have a partially reduced modulus of section by crushing the corresponding portions so that these portions become smaller in diameter than the other portions or by cutting only these portions into a semi-tubular shape.

Figure 12:
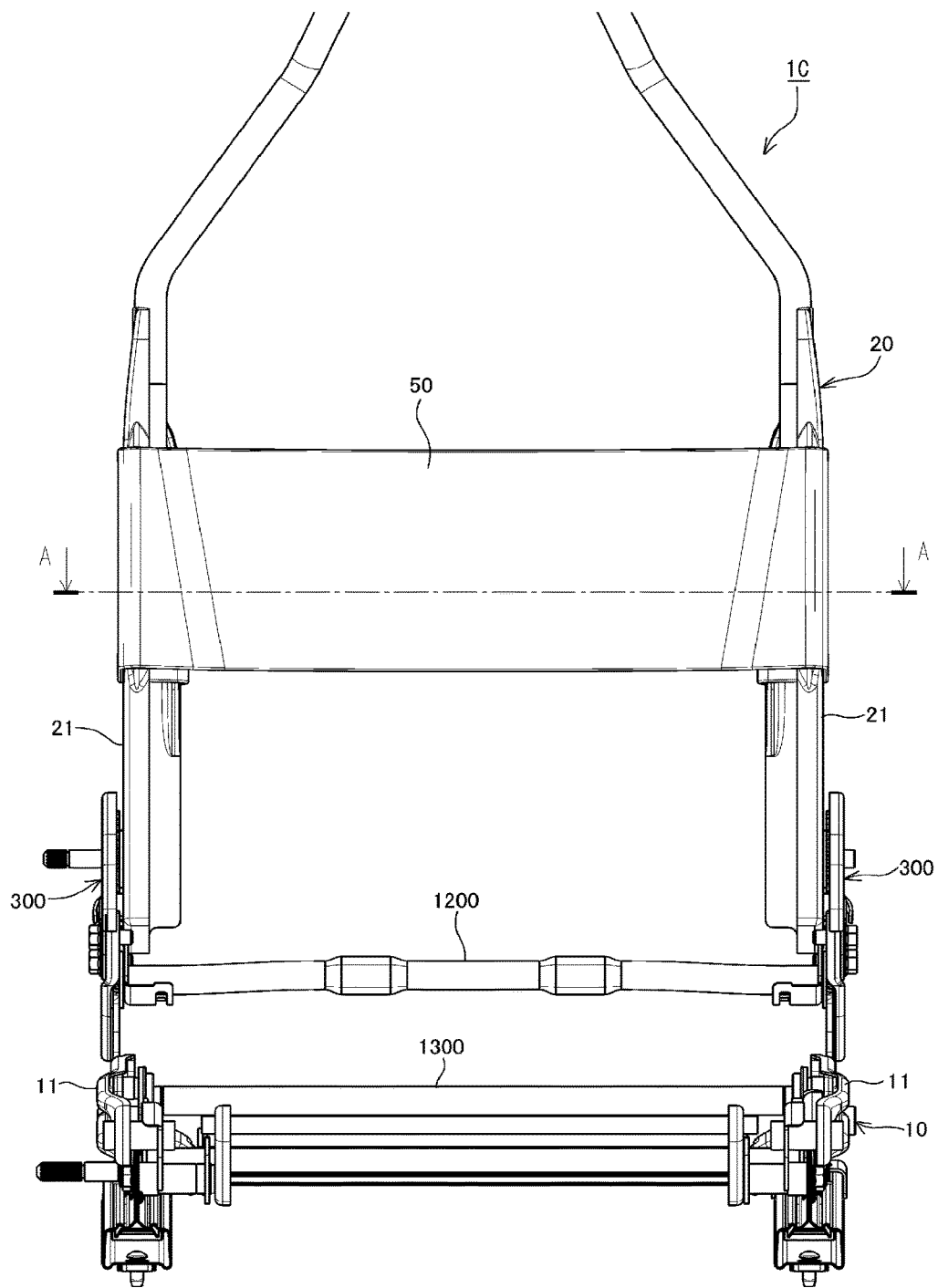
FIG. 12 is a front view illustrating a seat structure according to a third embodiment of the present invention (excluding cushioning members and so on supported by a cushion frame, a back frame, and so on. A net member of the back frame is illustrated).
Figure 13:
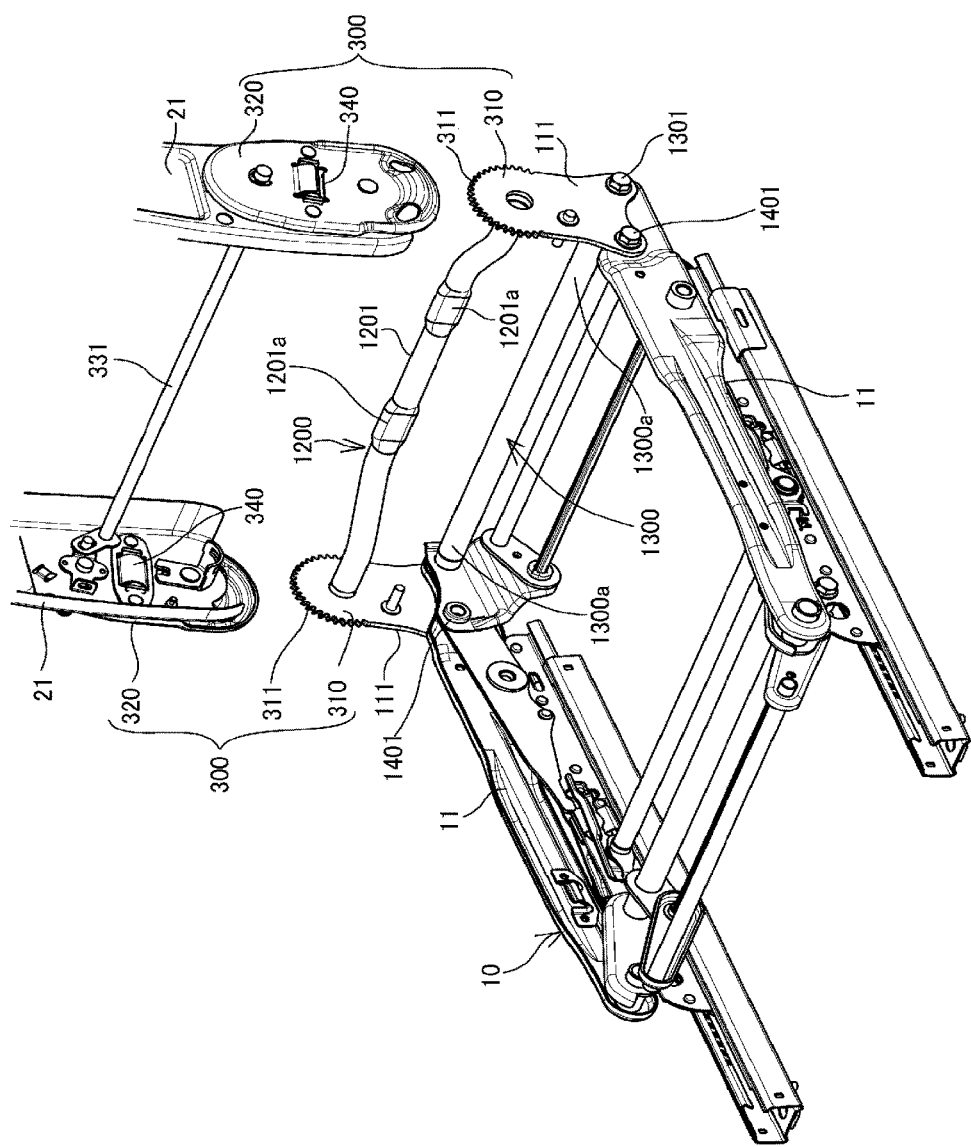
FIG. 13 is a perspective view illustrating an essential part of the seat structure according to the third embodiment.
Figure 14:
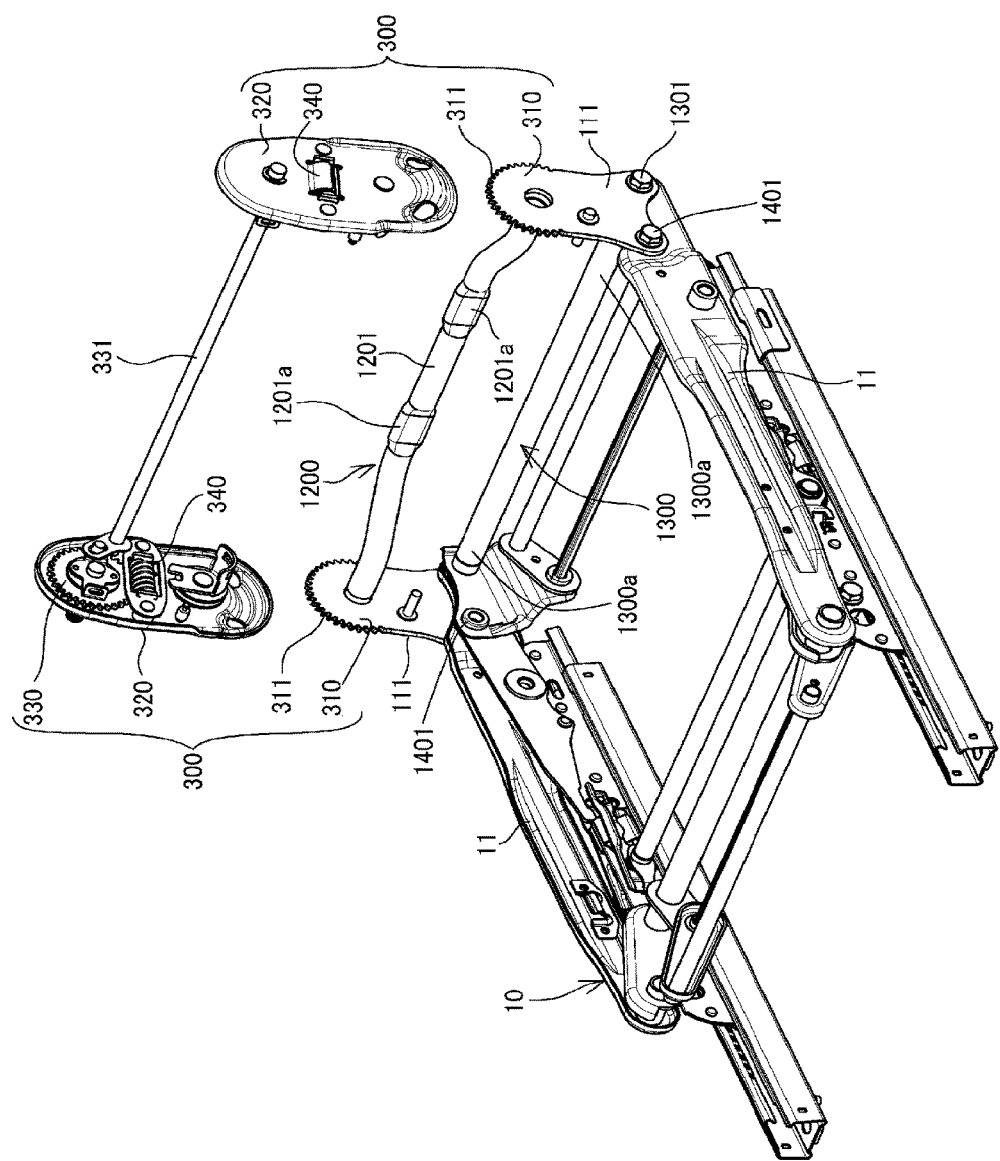
FIG. 14 is a perspective view illustrating the essential part of the seat structure according to the third embodiment, with reclining mechanism parts being illustrated in more detail than in FIG. 13.
Figure 15:
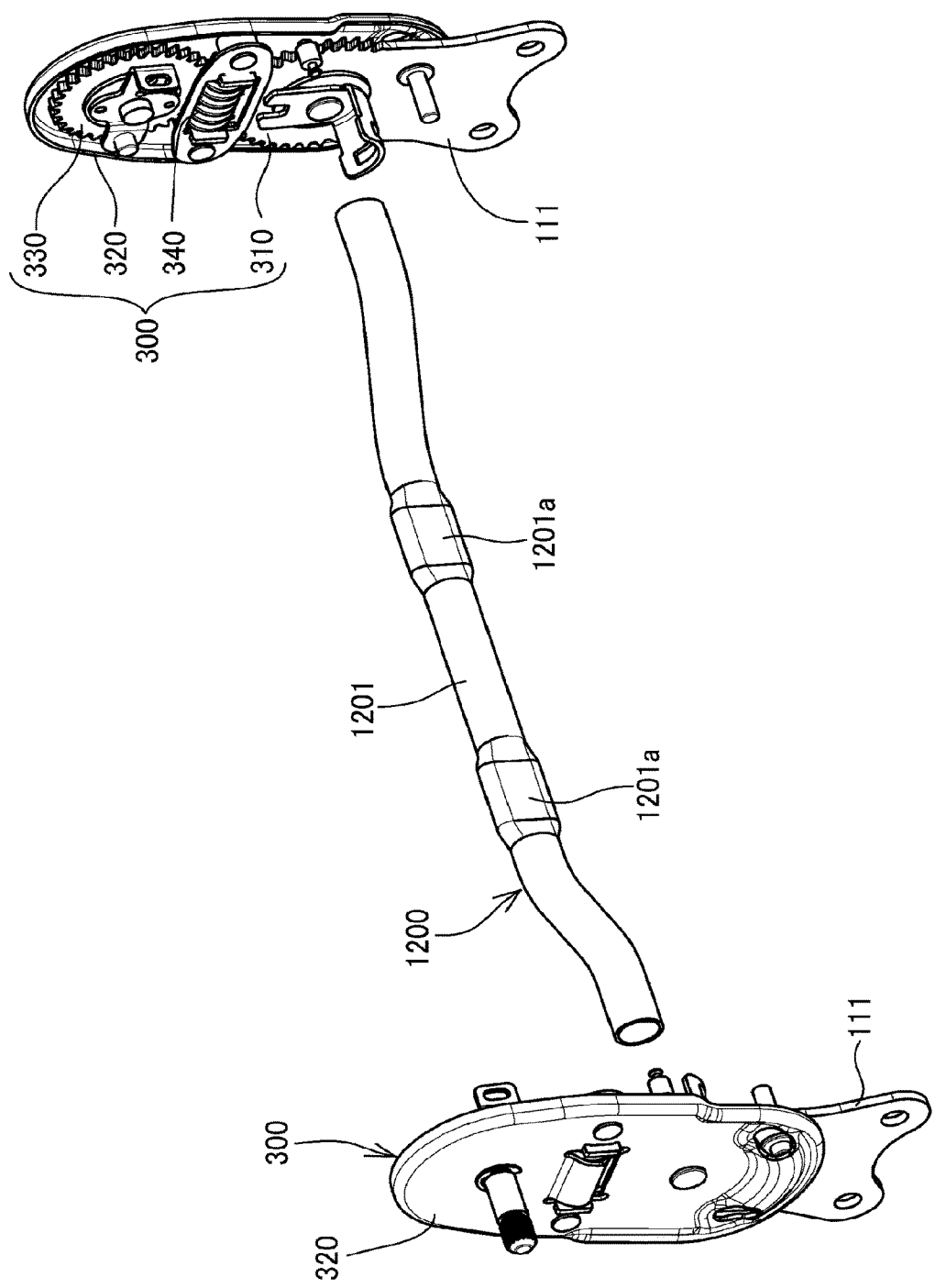
FIG. 15 is an exploded perspective view illustrating the structure of the reclining mechanism parts in the seat structure according to the third embodiment in detail.
Figure 16:
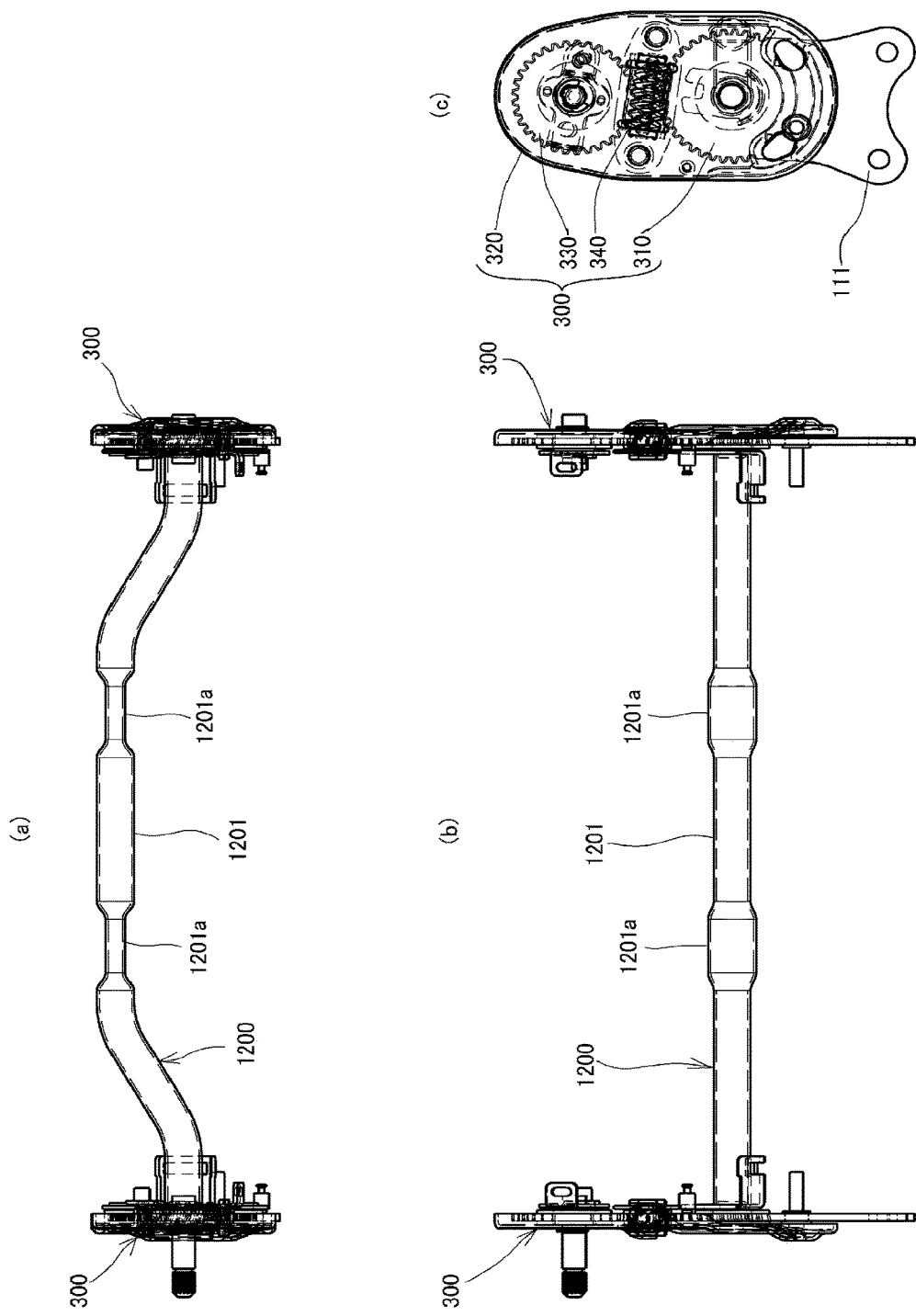
FIG. 16(a) is a plane view of the reclining mechanism parts illustrated in FIG. 15.
FIG. 16(b) is a front view thereof.
FIG. 16(c) is a side view thereof.
Figure 17:
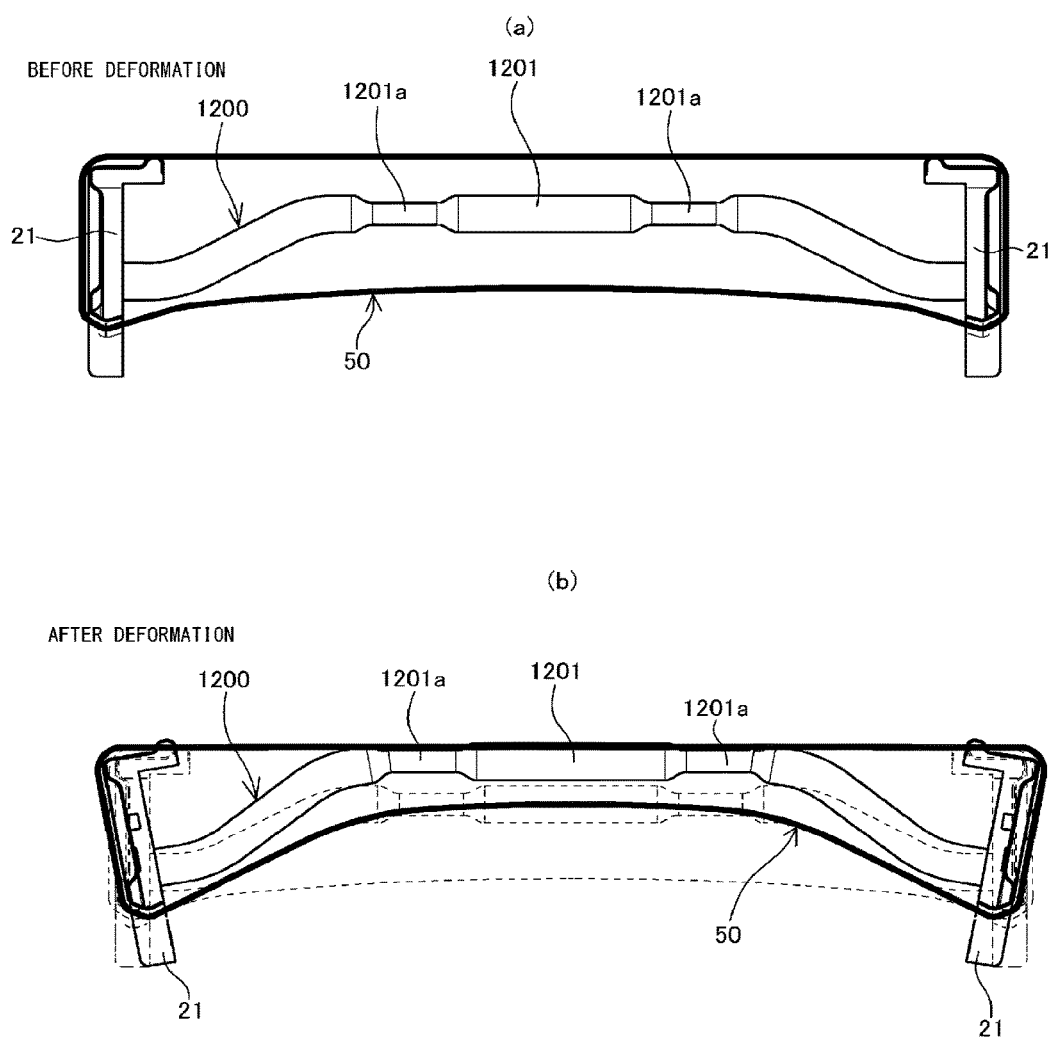
FIG. 17(a) is a plane view illustrating a positional relation between the back frame and the net member before they deform due to the application of an impact force.
FIG. 17(b) is a plane view after the deformation.

Further, between the back-part side frames 21, 21 of the back frame 20, a net member (two-dimensional or three-dimensional fabric or the like) 50 is preferably stretched as illustrated in FIG. 12. When the human body is displaced rearward at the time of the application of an impact due to a rear-end collision or the like, a load is given to the net member. Consequently, the back-part side frames 21, 21 gradually deform to tilt inward as illustrated in FIG. 17(b) from the state prior to the application of the impact force in FIG. 17(a), and at the same time the rearward projecting portion 1201 is displaced rearward, with the force given to the easily deforming portions 1201a, 1201a serving as a trigger of the deformation as described above. When the back-part side frames 21, 21 gradually deform to tilt inward, the net member 50 decreases in tension to be capable of receiving the human body while reducing the rebounding of the human body.

In this embodiment as well, the cushion frame 10 and the back frame 20 are integrated by the reinforcing structure X3 in the substantially rectangular frame shape via the reclining mechanism parts 300, 300, and similarly to the above-described first and second embodiments, the impact is not withstood by only the back frame 20 but in addition, can be withstood by strengths of the cushion frame 10 and the reclining mechanisms parts 300, 300, so that high backward moment strength can be exhibited. Further, in this embodiment, owing to the rearward projecting portion 1201 and the easily deforming portions 1201a, 1201a formed in the first bridge member 1200, the human body moving rearward is received in the rearward projecting portion 1201 so as not to be prevented from moving rearward, and in addition, since the first bridge member 1200 deforms by being triggered by the deformation of the easily deforming portions 1201a, 1201a and thus impact energy can be absorbed owing to this deformation.

Figure 18:
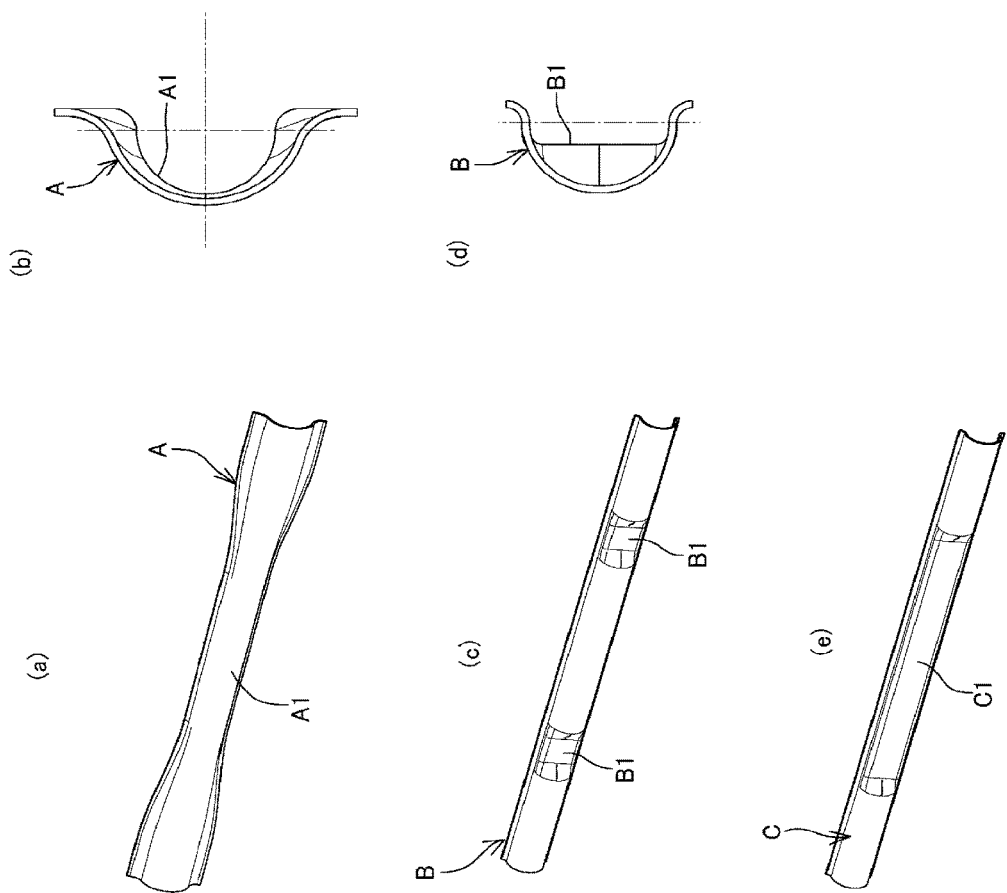
FIGS. 18(a) to (e) are views illustrating other examples of an easily deforming portion which is formed in a case where a bridge member is provided behind the hip point.
Figure 19:
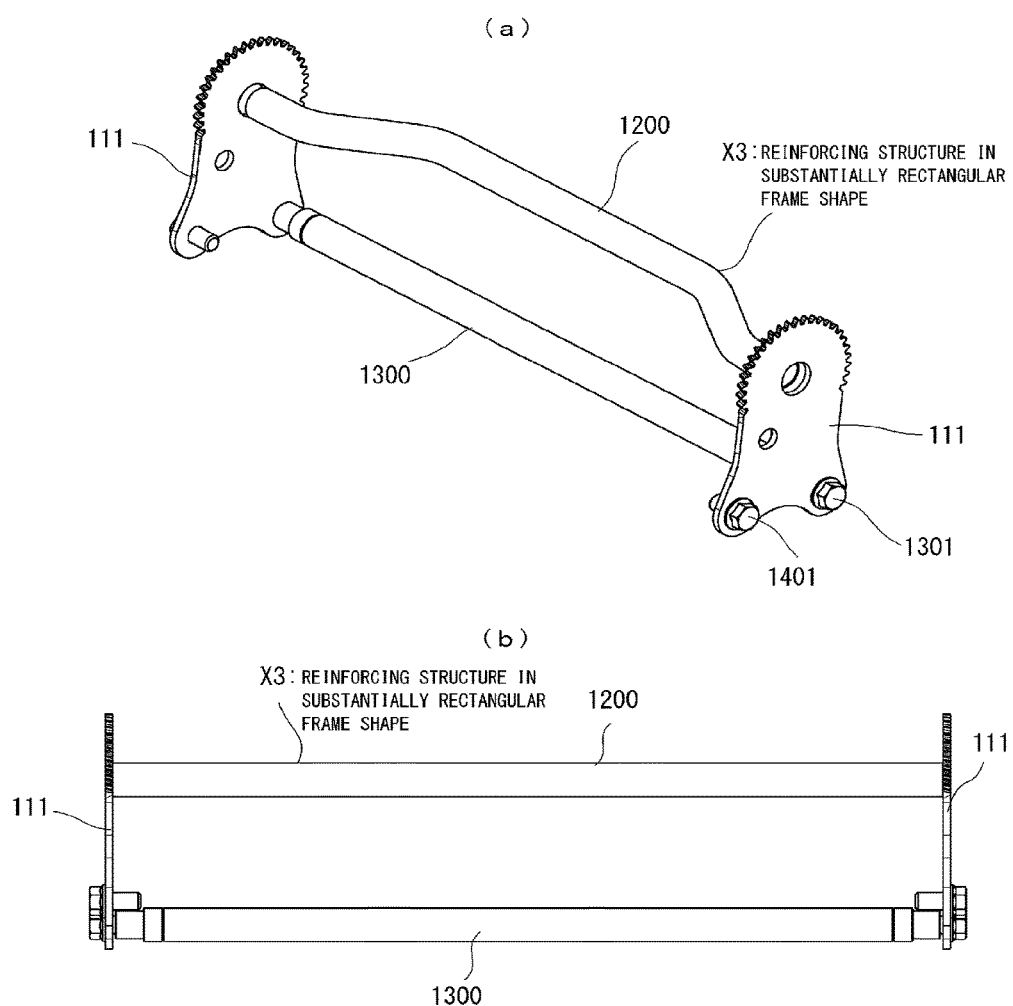
FIG. 19(a) is a perspective view illustrating a reinforcing structure in a substantially rectangular frame shape in the third embodiment.
FIG. 19(b) is a front view of FIG. 19(a).

FIG. 18 are views illustrating other examples of the easily deforming portion formed in the case where the bridge member is provided behind the hip point. FIGS. 18(a), (b) illustrate a bridge member A having a substantially semi-tubular cross section and having an easily deforming portion A1 in the vicinity of its middle which is narrowed to be smaller in diameter and thus smaller in a modulus of section than vicinities of its end portions. Further, FIGS. 18(c), (d) illustrate a bridge member B having a substantially semi-tubular cross section and having easily deforming portions B1, B1 with a smaller modulus of section at two places which are at a predetermined interval from each other. FIG. 18(e) illustrates a bridge member C having a substantially semi-tubular cross section and having an easily deforming portion C1 which is formed by forming a flat surface along a predetermined length of the vicinity of its middle. Incidentally, by heat-treating, for example, the vicinity of the apex portion of the substantially semi-tubular cross section according to the plate thickness or material, it is also possible for these bridge members A to C to have desired strength. It goes without saying that not only the bridge members A to C illustrated in FIG. 18 but also the first and second bridge members described in the first to third embodiments are heat-treatable as required.

Figure 20:
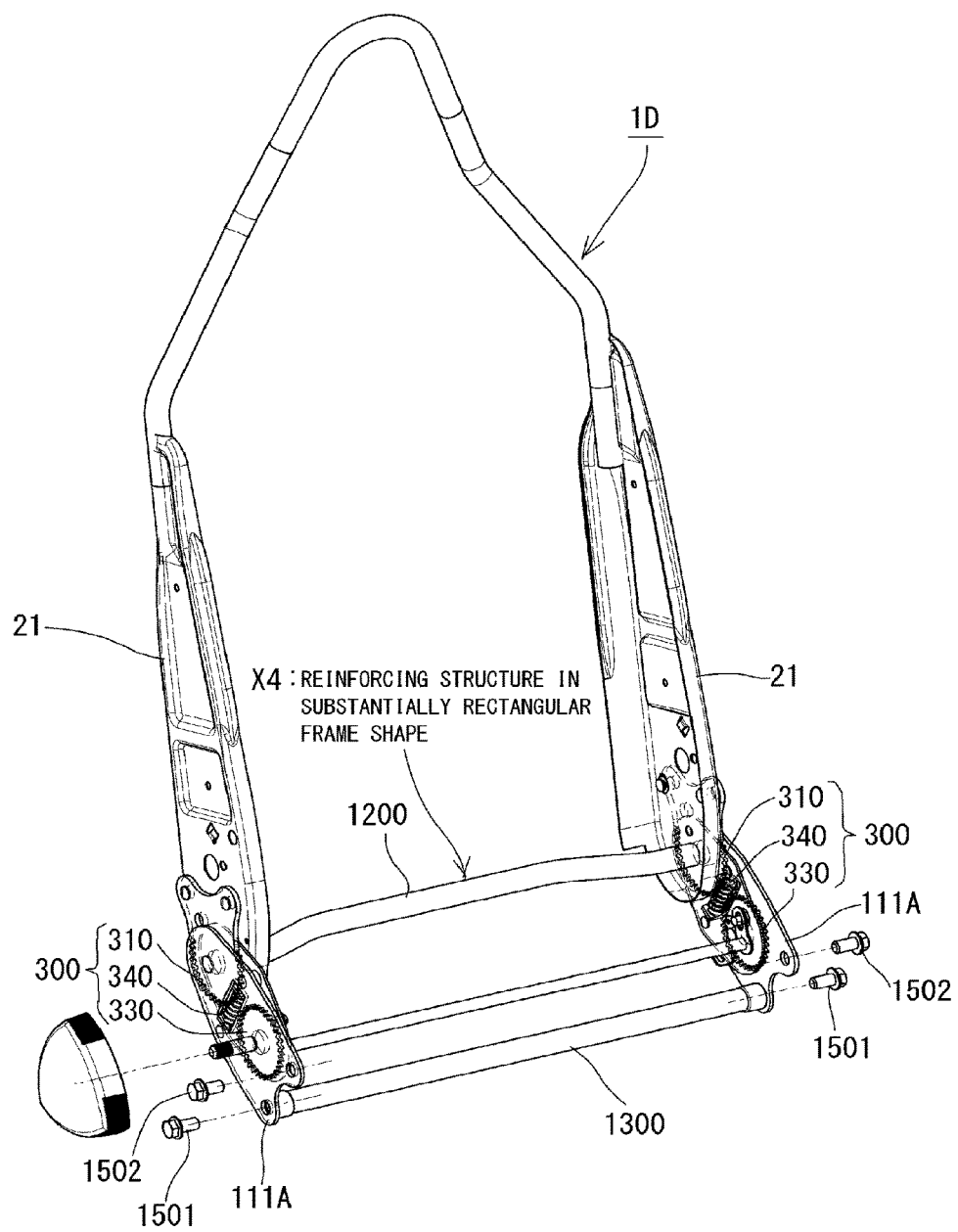
FIG. 20 is a perspective view illustrating an essential part of a seat structure according to a fourth embodiment.
Figure 21:
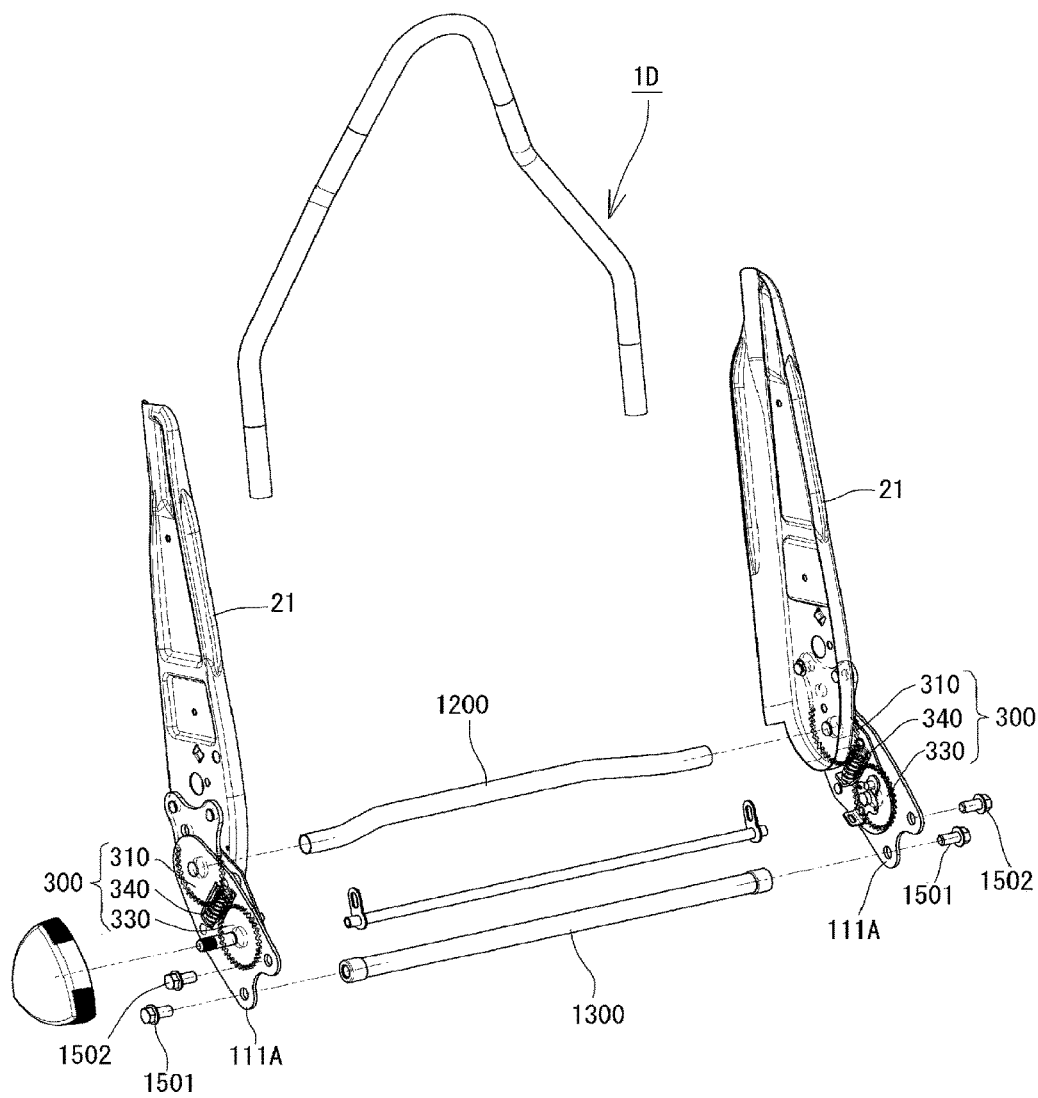
FIG. 21 is an exploded perspective view of FIG. 20.

FIG. 20 and FIG. 21 are views illustrating a seat structure 1D according to a fourth embodiment of the present invention. In this embodiment, reclining mechanism parts 300, 300 including driving worm wheels 310, 310, driven worm wheels 330, and worms 340 similar to those of the third embodiment are provided on the left and right. However, this embodiment is different from the third embodiment in that the driving worm wheels 310, 310 are fixed to back-part side frames 21, 21 and the driven worm wheels 330, 330 are rotatably supported on cushion-side brackets 111A, 111A. The worms 340, 340 together with the driven worm wheels 330, 330 are supported by the cushion-side brackets 111A, 111A.

In this embodiment as well, the driving worm wheels 310, 310 do not rotate because they are fixed to the back-part side frames 21, 21, and a first bridge member 1200 is disposed to extend between these non-rotating driving worm wheels 310, 310. A second bridge member 1300 is fixed to front lower end portions of the cushion-side brackets 111A, 111A via bolts 1501, 1501. Front upper end portions of the cushion-side brackets 111A, 111A are fixedly coupled to cushion-part side frames via bolts 1502, 1502. Consequently, in this embodiment similarly to the third embodiment, the cushion-side brackets 111A, 111A and the driving worm wheels 310, 310 constitute the aforesaid "pair of rigid members", and the pair of rigid members and the first and second bridge members 1200, 1300 arranged at a predetermined interval from each other in a substantially up and down direction constitute a "reinforcing structure X4 in a substantially rectangular frame shape".

Figure 22:
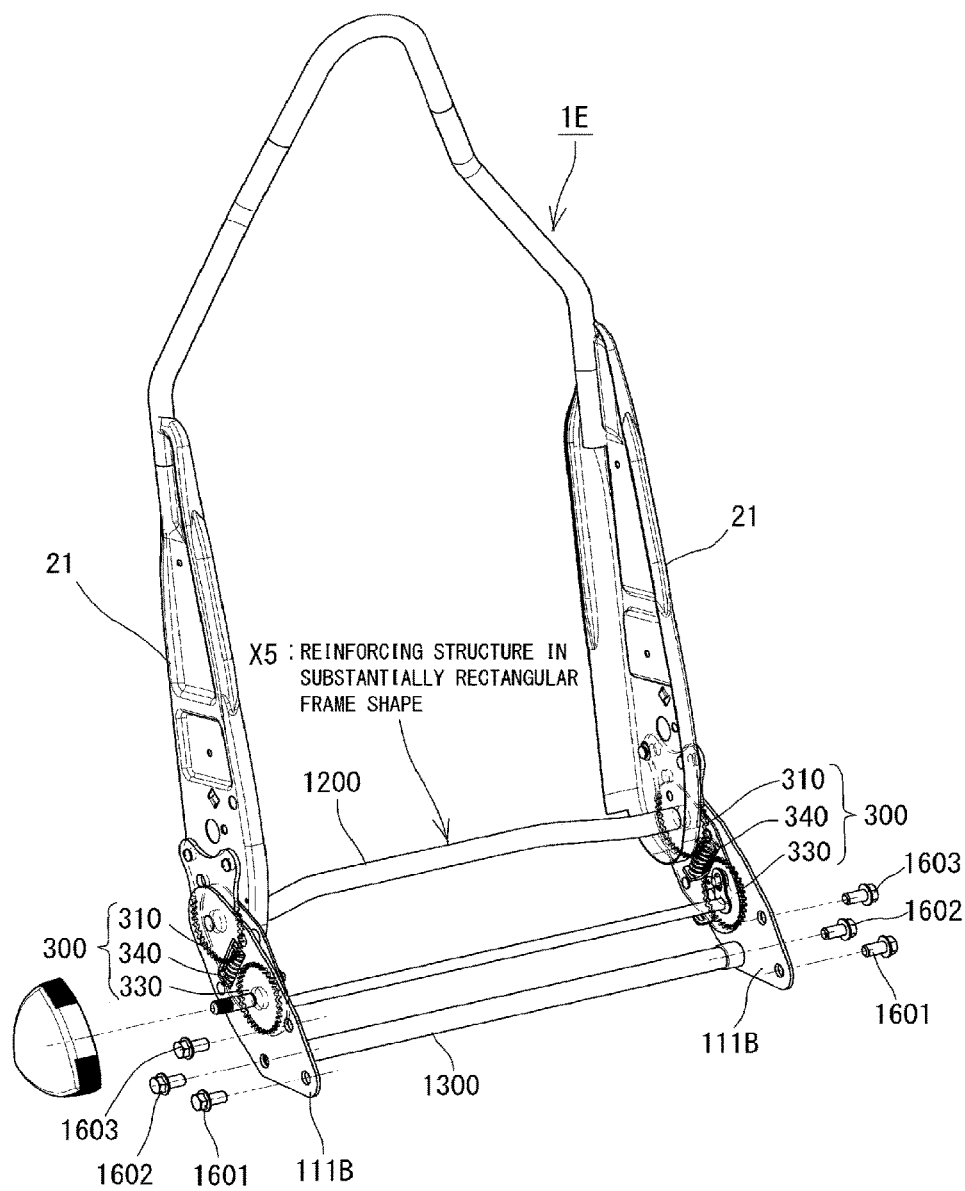
FIG. 22 is a perspective view illustrating an essential part of a seat structure according to a fifth embodiment.
Figure 23:
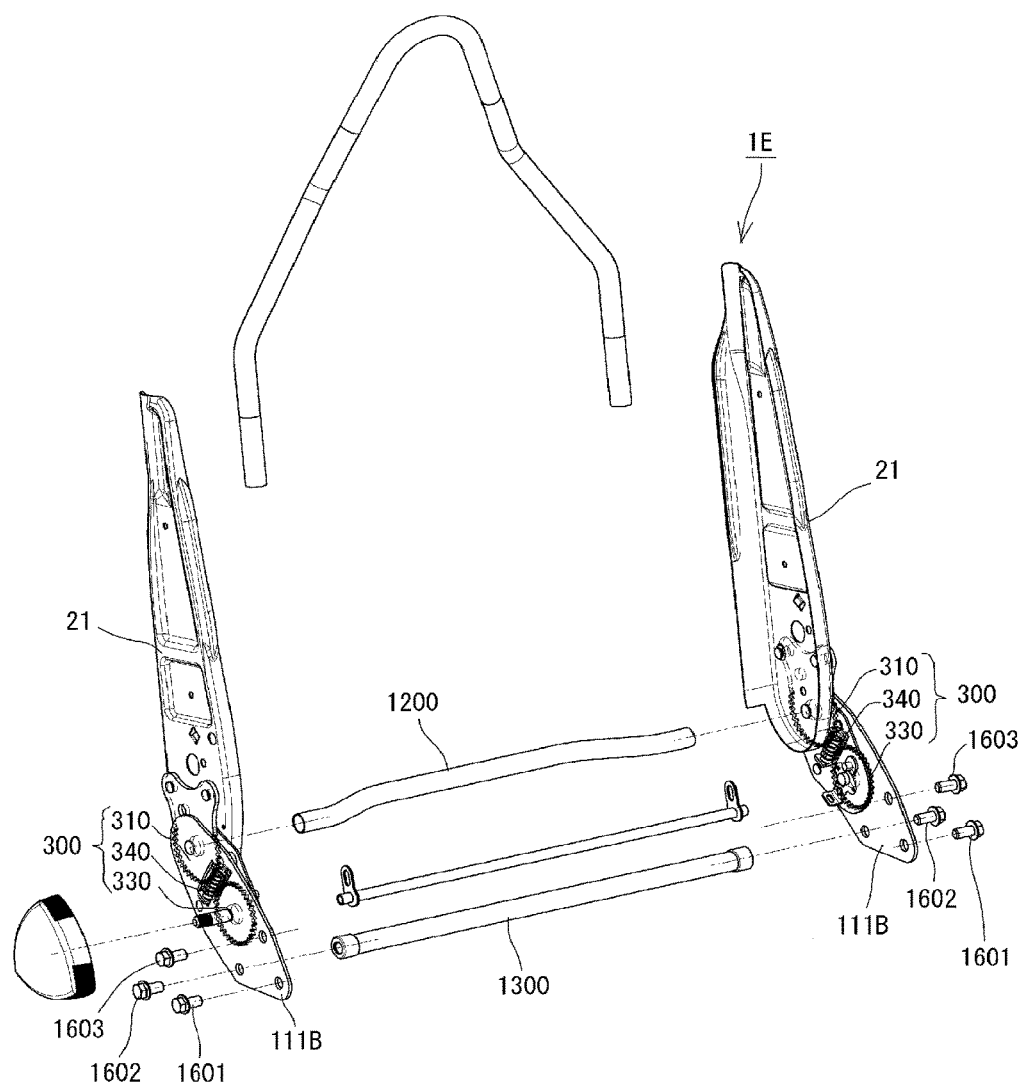
FIG. 23 is an exploded perspective view of FIG. 22.

FIG. 22 and FIG. 23 are views illustrating a seat structure 1E according to a fifth embodiment of the present invention. This embodiment is substantially the same as the fourth embodiment, but cushion-side brackets 111B, 111B have a larger area by having their front edge sides extending more forward than those used in the fourth embodiment. This makes it possible to couple each of the cushion-side brackets 111B, 111B to a cushion-part side frame (not illustrated) at three places via bolts 1601 to 1603. The coupling at three places makes it possible for a "reinforcing structure X5 in a substantially rectangular frame shape" to have higher rigidity than that illustrated in FIG. 20 and FIG. 21.

Test Examples

Regarding the seat structure 1A according to the first embodiment, the seat structure 1C according to the third embodiment, and so on, backward moment strength was measured. In measuring the backward moment strength, a dummy hip point (H.P.) provided with a load jig was set at a designed hip point of the seat structure, and a load (load speed 0.5 deg/s) was applied backward to the seat back part to generate 588 N·m moment around H.P.

Figure 24:
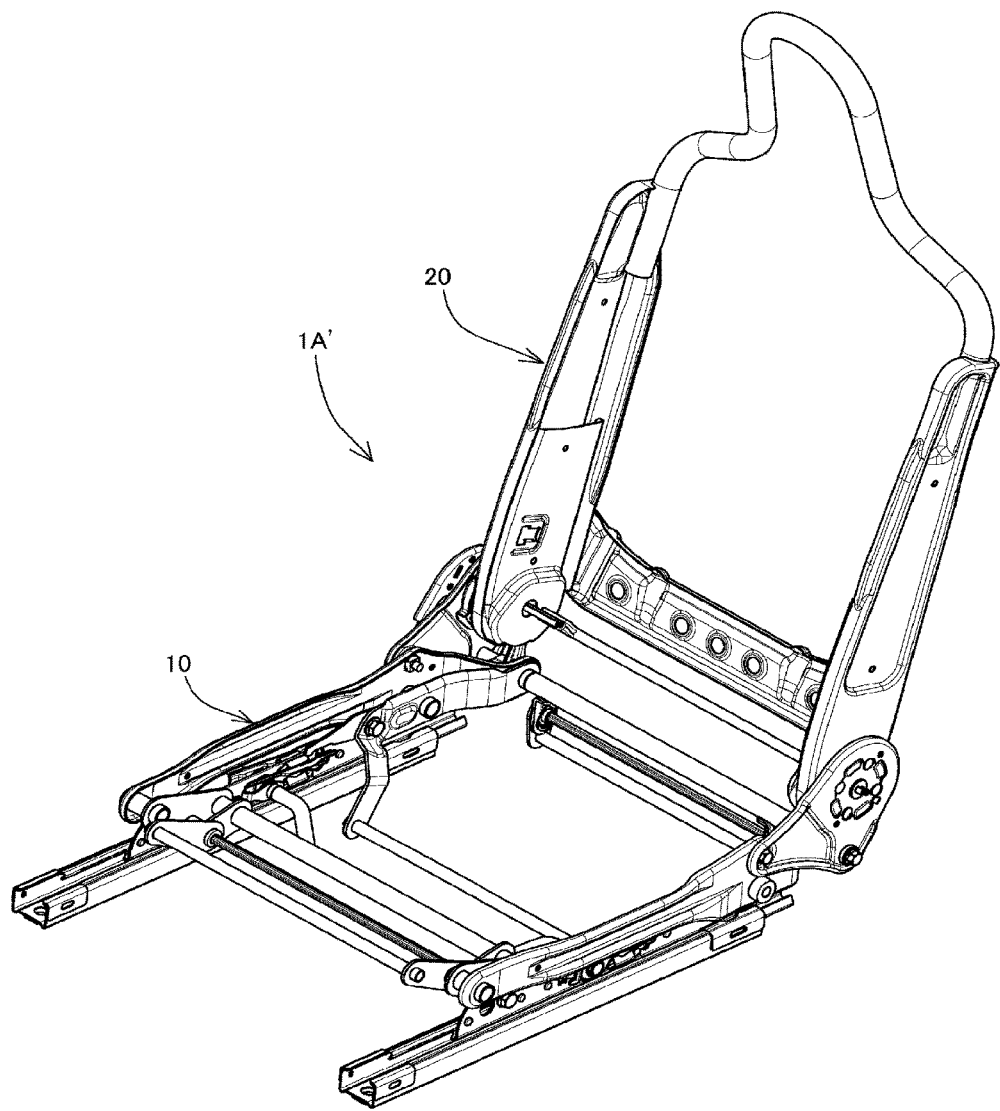
FIG. 24 is a perspective view illustrating a seat structure of a comparative example 1.
Figure 25:
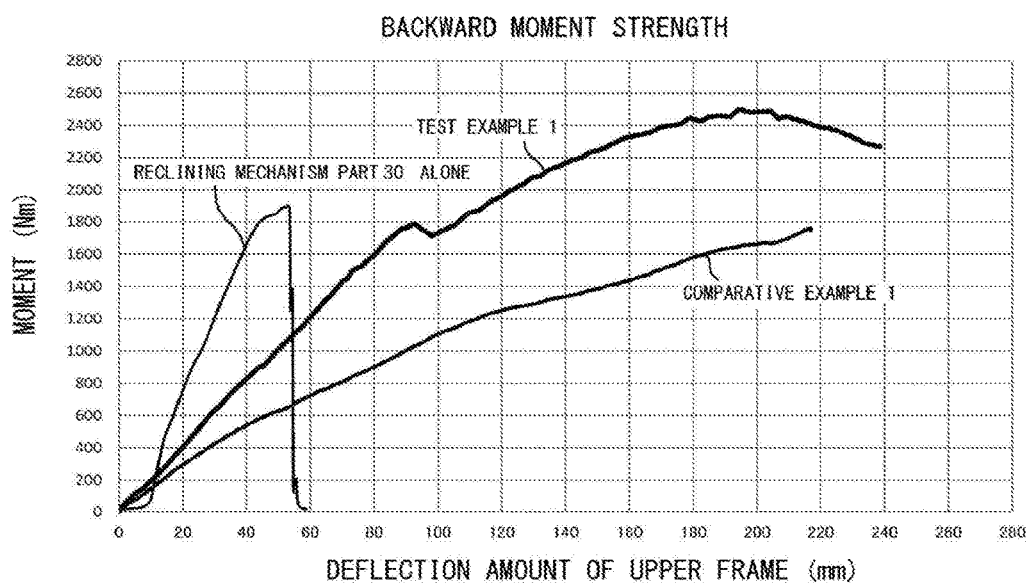
FIG. 25 is a chart illustrating test results of a test example 1.

FIG. 25 illustrates the backward moment strength of the seat structure 1A (test example 1) according to the first embodiment including the reclining mechanism parts 30, 30 using the engagement between the internal teeth of the internal gear and the external teeth of the lock gear as described above. A comparative example 1 represents backward moment strength of a seat structure 1A' (comparative example 1) illustrated in FIG. 24 which is the same as the seat structure 1A according to the first embodiment except that the seat structure 1A' does not have the reinforcing structure in the substantially rectangular frame shape. Further, strength of the reclining mechanism parts 30 alone of the seat structure 1A according to the first embodiment is also illustrated.

The backward moment strength of the test example 1 was about 2500 N·m, which was about 1.5 times as high as about 1700 N·m backward moment strength of the comparative example 1. In the test example 1, up to an instant when a deflection amount of an upper frame reaches about 90 mm, a gradient of a deflection curve is between a gradient of a deflection curve of the reclining mechanism parts 30 alone and a gradient of a deflection curve of the comparative example 1. Therefore, up to the instant when the deflection amount reaches about 90 mm, the load is withstood by the strength of the cushion frame 10 which is integrated with the back frame 20 via the reinforcing structure X1 in the substantially rectangular frame shape and the strength of the reclining mechanism parts 30. This is a phenomenon that occurs because the seat structure has laterally equal rigidity and the input load is shared and supported substantially uniformly by the whole seat structure. Thereafter, the gradient of the deflection curve of the test example 1 approaches the gradient of the deflection curve of the comparative example 1. In the comparative example 1, due to the absence of the reinforcing structure in the substantially rectangular frame shape, the back frame 20 first deforms, and the deflection curve of the comparative example 1 represents substantially mainly the strength of the back frame 20. Therefore, in the case of the test example 1, up to the deflection amount of about 90 mm, the strength of the cushion frame 10 and the strength of the reclining mechanism parts 30 are mainly exhibited, and thereafter, the strength of the back frame 20 is mainly exhibited. Accordingly, the seat structure 1A according to the test example 1 can have higher backward moment strength than the comparative example 1 in which the strength of the back frame 20 is exhibited early.

Figure 26:
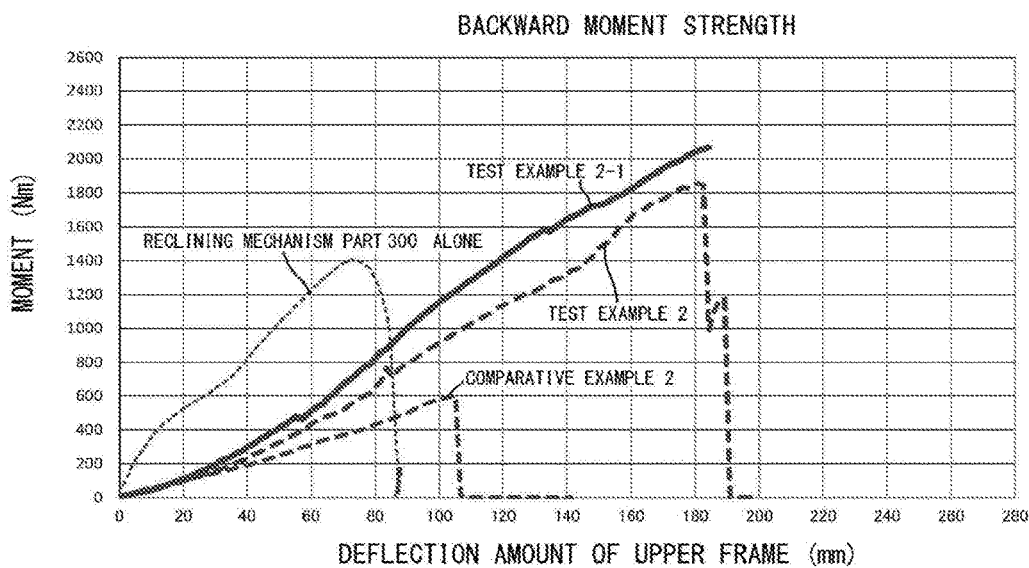
FIG. 26 is a chart illustrating test results of a test example 2.

FIG. 26 illustrates the backward moment strength of the seat structure 1C (test example 2) according to the third embodiment. A comparative example 2 includes the same reclining mechanism parts 300 as those of the third embodiment, that is, the reclining mechanism parts 300 each including the driving worm wheel and the driven worm wheel with the worm therebetween, but does not have the first bridge member 1200 disposed behind the hip point, that is, does not have the reinforcing structure X3 in the substantially rectangular frame shape. Further, the strength of the reclining mechanism parts 300 alone each using the worm gear and the two worm wheels in the seat structure 1C according to the third embodiment is also illustrated.

The backward moment strength of the test example 2 was about 1850 N·m, which was about three times as high as about 600 N·m backward moment strength of the comparative example 2. In the test example 2, up to an instant when a deflection amount reaches about 160 mm, a gradient of a deflection curve is between a gradient of a deflection curve of the reclining mechanism parts 300 alone and a gradient of a deflection curve of the comparative example 2, and thereafter approaches the gradient of the deflection curve of the comparative example 2. Therefore, up to the deflection amount of about 160 mm, the strength of the cushion frame 10 integrated with the back frame 20 via the reinforcing structure X3 in the substantially rectangular frame shape and the strength of the reclining mechanism parts 300 are mainly exhibited, and thereafter, the strength of the back frame 20 is mainly exhibited. It is seen from this that the seat structure 1C according to the test example 2 can have higher backward moment strength than the comparative example 2 in which the strength of the back frame 20 is exhibited early.

Further, in both the test examples 1 and 2, owing to the integration of the cushion frame 10 and the back frame 20 by the reinforcing structure X3 in the substantially rectangular frame shape, lateral misalignment of the engagement between the teeth of the gears constituting the reclining mechanism parts 30, 300 (in the test example 1, the internal teeth and the external teeth, and in the test example 2, the teeth of the worm wheels and the teeth of the worms) is small and the contact area between the both does not easily reduce. Accordingly, the engagement between the teeth of the gears with no lateral misalignment easily continues, which also contributes to an improvement of the backward moment strength. Incidentally, the test example 2 uses the heat-treated worm and uses the worm wheel not heat-treated. Accordingly, when the load becomes large, the load is likely to concentrate on the worm wheel since the worm is hard. Here, the same test was also conducted on the seat structure 1C using a worm not heat-treated. The worm used here is fabricated by form rolling, and its teeth surfaces have predetermined hardness by being hardened by this process even though the worm is not heat-treated. That is, in a normal use state, they have hardness high enough to withstand the load input from the seat back. A test example 2-1 illustrated in FIG. 26 represents backward moment strength when the worm not heat-treated is used. As is apparent from the drawing, in the test example 2-1, the moment temporarily decreases at about 1600 N·m. This indicates that the worm deformed together with the worm wheel due to the input of a larger load than in the normal use state. Thereafter, the test example 2-1 exhibits high backward moment strength exceeding 2000 N·m because the both further deform as a unit.

Further, setting the reinforcing structure X1 to X5 in the substantially rectangular frame shape makes it possible to make use of not only the strength of the back frame 20 but also the strength of the cushion frame 10 via the reclining mechanism parts 30, 300 as described above, and in addition the presence of the reinforcing structure X1 to X5 in the substantially rectangular frame shape reduces the torsional deformation caused by the input of an impact load and causes the impact load to be equally distributed to the left and right. This is also apparent from the fact that the rearward moment strengths of the test example 1 and the test example 2 (including 2-1) are higher than the strength of the reclining mechanism parts alone as illustrated in FIG. 25 and FIG. 26. To put it the other way round, this means that, for example, even if reclining mechanism parts having lower strength than conventionally are adopted, it is possible to obtain a seat structure having desired backward moment strength and to contribute to a weight reduction and a manufacturing cost reduction of the seat structure.

EXPLANATION OF REFERENCE SIGNS 1A, 1B, 1C, 1D, 1E seat structure
10 cushion frame
11 cushion-part side frame
110 joining bracket
111 cushion-side bracket
120, 1200 first bridge member
130, 1300 second bridge member
20 back frame
21 back-part side frame
30, 300 reclining mechanism part
310 driving worm wheel
320 gear attachment bracket
330 driven worm wheel
340 worm
X1, X2, X3, X4, X5 reinforcing structure in substantially rectangular frame shape

The invention claimed is:

1. A seat structure which includes a seat cushion part and a seat back part coupled to each other via a reclining mechanism part, the seat structure comprising:
a reinforcing structure in a substantially rectangular frame shape provided in an area where the seat cushion part and the seat back part are coupled to each other via the reclining mechanism part, from cushion-part side frames included in a cushion frame of the seat cushion part up to back-part side frames included in a back frame of the seat back part, the reinforcing structure including a pair of rigid members provided in side portions of the area and at least two bridge members arranged at an interval from each other and extending between the pair of rigid members along a left and right direction,
wherein the at least two bridge members are set within an area not higher than a designed hip point, and are set in such a positional relation that the bridge member disposed more rearward is set at a position higher than the bridge member disposed more forward,
wherein the reclining mechanism part comprises parts which are provided in pair on left and right, and
wherein each of the pair of rigid members included in the reinforcing structure is comprised of a joining bracket that has relatively higher rigidity than the cushion-part side frame or the back-part side frame to which the joining bracket is coupled, and the joining bracket is coupled to a rear portion of the cushion-part side frame and a lower portion of the back-part side frame.

2. The seat structure according to claim 1, wherein at least one of the bridge members included in the reinforcing structure is set behind the hip point and has a rearward projecting portion that projects rearward.

3. The seat structure according to claim 1, wherein the at least one of the bridge members included in the reinforcing structure is set behind the hip point and has an easily deforming portion that serves as a starting point of deformation caused by a rearward load.

4. The seat structure according to claim 1, wherein the left and right rigid members each have at least two coupling portions coupled to the at least two bridge members, and in addition, have at least one coupling portion coupled to the cushion-part side frame.

5. The seat structure according to claim 1, wherein the rigid members included in the reinforcing structure are constituted by gears disposed to face each other in the pair of left and right reclining mechanism parts.

6. The seat structure according to claim 1, wherein the rigid members have a larger plate thickness than a plate thickness of the rear portions of the cushion-part side frames coupled to the reclining mechanism parts or a plate thickness of the lower portions of the back-part side frames coupled to the reclining mechanism parts.

7. The seat structure according to claim 1, a difference between a set height of a middle portion of the bridge member disposed more forward and a set height of the bridge member disposed more rearward is set such that an angle of a virtual line connecting the middle position of bridge member disposed more forward and the middle position of the bridge member disposed more rearward relative to a sliding direction line of a slider is within a range of 3 to 70 degrees.

8. The seat structure according to claim 7, the angle is within a range of 10 to 45 degrees.

* * * * *